US012220915B2

(12) United States Patent
Yoshida et al.

(10) Patent No.: US 12,220,915 B2
(45) Date of Patent: Feb. 11, 2025

(54) LIQUID DISCHARGE APPARATUS, DRIVE WAVEFORM GENERATION DEVICE, AND HEAD DRIVE METHOD

(71) Applicants: Takahiro Yoshida, Kanagawa (JP); Kenichi Taguma, Kanagawa (JP)

(72) Inventors: Takahiro Yoshida, Kanagawa (JP); Kenichi Taguma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 156 days.

(21) Appl. No.: 18/095,139

(22) Filed: Jan. 10, 2023

(65) Prior Publication Data

US 2023/0249455 A1 Aug. 10, 2023

(30) Foreign Application Priority Data

Feb. 9, 2022 (JP) ................................ 2022-019129

(51) Int. Cl.
*B41J 2/045* (2006.01)

(52) U.S. Cl.
CPC ....... *B41J 2/04588* (2013.01); *B41J 2/04581* (2013.01)

(58) Field of Classification Search
CPC B41J 2/04588; B41J 2/04581; B41J 2/04516; B41J 2/04541; B41J 2/14274; B41J 2002/14403; B41J 2202/20; B41J 2/04593; B41J 2/04596; B41J 2/04501; B41J 2/14; B41J 2/14201
See application file for complete search history.

(56) References Cited

U.S. PATENT DOCUMENTS

2007/0080978 A1 4/2007 Yoshida
2009/0289975 A1 11/2009 Yoshida
2012/0320118 A1* 12/2012 Yokomaku ........... B41J 2/04581 347/11
2014/0218428 A1 8/2014 Araki et al.
2014/0285554 A1 9/2014 Yanaka et al.
2015/0375504 A1 12/2015 Kitaoka et al.
2019/0283414 A1 9/2019 Yoshida
2021/0001629 A1 1/2021 Yoshida
2022/0169020 A1 6/2022 Yoshida

FOREIGN PATENT DOCUMENTS

JP 2017-105131 6/2017

* cited by examiner

*Primary Examiner* — Bradley W Thies
(74) *Attorney, Agent, or Firm* — Duft & Bornsen, PC

(57) ABSTRACT

A liquid discharge apparatus includes: a head including a pressure chamber and a nozzle, the head configured to discharge a liquid in the pressure chamber from the nozzle; circuitry configured to generate a drive waveform including multiple drive pulses to be applied to the head, the drive waveform successively including, in time series: a non-discharge pulse that does not cause the head to discharge the liquid from the nozzle; a latter discharge pulse after the non-discharge pulse, the latter discharge pulse including a contraction waveform element that contracts the pressure chamber to discharge the liquid from the nozzle; and a contraction waveform including the contraction waveform element that contracts the pressure chamber.

18 Claims, 15 Drawing Sheets

LIQUID DISCHARGE APPARATUS, DRIVE WAVEFORM GENERATION DEVICE, AND HEAD DRIVE METHOD

CROSS-REFERENCE TO RELATED APPLICATIONS

This patent application is based on and claims priority pursuant to 35 U.S.C. § 119(a) to Japanese Patent Application No. 2022-019129, filed on Feb. 9, 2022, in the Japan Patent Office, the entire disclosure of which is hereby incorporated by reference herein.

BACKGROUND

Technical Field

Aspects of the present disclosure relate to a liquid discharge apparatus, a drive waveform generation device, and a head drive method.

Related Art

When a liquid is discharged from a liquid discharge head, it is desirable to suppress satellite droplets caused by a subsequent effect that occurs with discharge of the primary droplets.

A drive waveform includes, successively in time series, a non-discharge pulse that does not discharge the liquid and a discharge pulse that discharges the liquid. When the reference character Vp1 represents the wave height value of the non-discharge pulse, the reference character Td represents the time interval between the non-discharge pulse and the discharge pulse, and the reference character Tc represents the natural vibration period, the time interval Td falls within the range of Tc−0.2Tc to Tc+0.45Tc, and the wave height value Vp1 of the non-discharge pulse falls within the range of −10% to +10% of a wave height value Vpp1 by which the droplet velocity of the liquid discharged by the discharge pulse reaches a local minimum value.

SUMMARY

Brief Description of the Drawings

A more complete appreciation of embodiments of the present disclosure and many of the attendant advantages and features thereof can be readily obtained and understood from the following detailed description with reference to the accompanying drawings, wherein.

Figure 1:
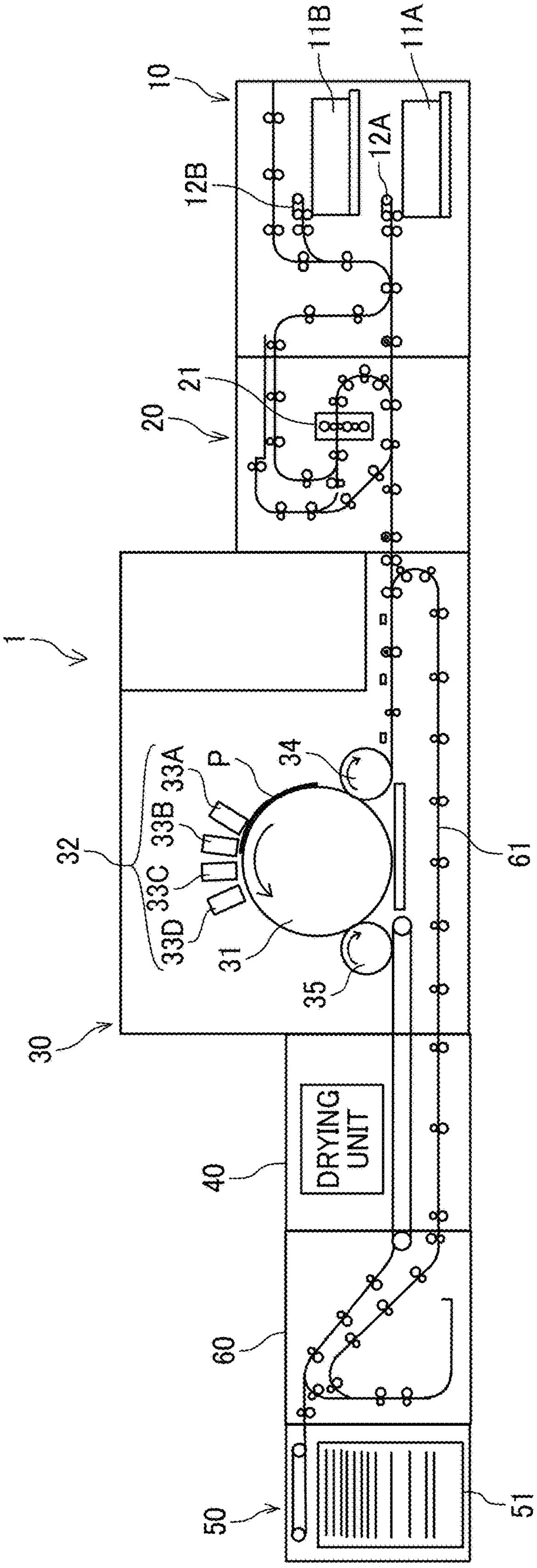
FIG. 1 is a schematic view of a printer as a liquid discharge apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Figure 2:
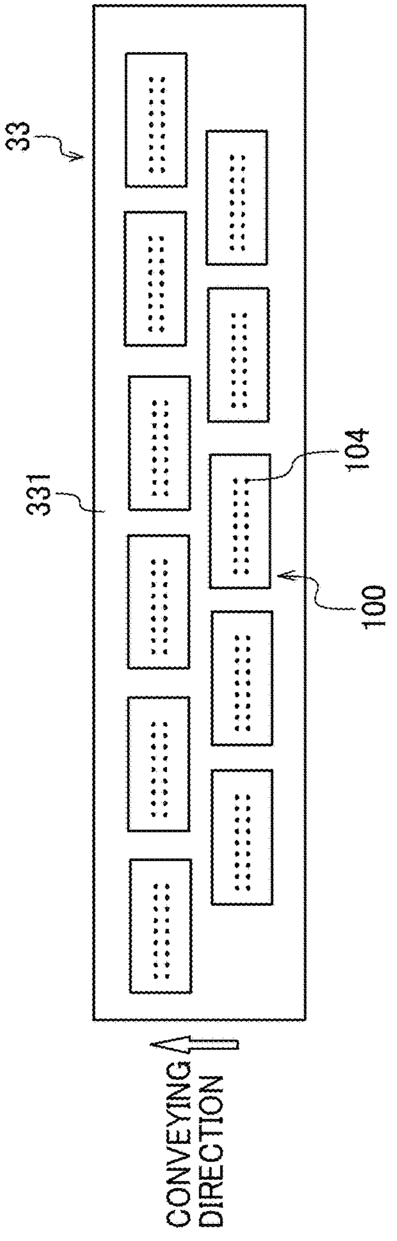
FIG. 2 is a plan view of a discharge unit of the printer.

Embodiments of the present disclosure will be described below referring to the drawings. A printer as a liquid discharge apparatus according to a first embodiment of the present disclosure is described referring to FIGS. 1 and 2. FIG. 1 is a schematic view of the printer. FIG. 2 is a plan view of a discharge unit of the printer.

A printer 1 is a liquid discharge apparatus including a loading unit 10 to load a sheet P, a pretreatment unit 20, a printing unit 30, a drying unit 40, and an ejection unit 50. In the printer 1, the pretreatment unit 20 applies (coats) a pretreatment liquid as appropriate onto the sheet P fed (supplied) from the loading unit 10, the printing unit 30 applies a liquid to the sheet P to perform desired printing, the drying unit 40 dries the liquid adhering to the sheet P, and then the sheet P is discharged to the ejection unit 50. The pretreatment unit 20 serves as a "pretreatment device".

The loading unit 10 includes loading trays 11 (a lower loading tray 11A and an upper loading tray 11B) to accommodate the sheets P and feeding devices 12 (a feeding device 12A and a feeding device 12B) to separate and feed the sheets P one by one from the loading trays 11, and supplies the sheet P to the pretreatment unit 20.

The pretreatment unit 20 includes, e.g., a coater 21 as a treatment-liquid applicator that coats a printing surface of the sheet P with a treatment liquid having an effect of aggregation of ink particles to prevent bleed-through.

The printing unit 30 includes a drum 31 and a liquid discharger 32. The drum 31 is a bearer (rotator) that bears the sheet P on a circumferential surface of the drum 31 and rotates. The liquid discharger 32 discharges liquids toward the sheet P borne on the drum 31.

The printing unit 30 further includes transfer cylinders 34 and 35. The transfer cylinder 34 receives the sheet P fed from the pretreatment unit 20 and forwards the sheet P to the drum 31. The transfer cylinder 35 receives the sheet P conveyed by the drum 31 and forwards the sheet P to the drying unit 40.

The transfer cylinder 34 includes a sheet gripper to grip a leading end of the sheet P conveyed from the pretreatment unit 20 to the printing unit 30. The sheet P thus gripped by the transfer cylinder 34 is conveyed as the transfer cylinder 34 rotates. The transfer cylinder 34 forwards the sheet P to the drum 31 at a position facing the drum 31.

Similarly, the drum 31 includes a sheet gripper on a surface of the drum 31, and the leading end of the sheet P is gripped by the sheet gripper of the drum 31. The drum 31 includes multiple suction holes dispersed on a surface of the drum 31. A suction device generates suction airflows directed from desired suction holes of the drum 31 to an interior of the drum 31.

The sheet gripper of the drum 31 grips the leading end of the sheet P forwarded from the transfer cylinder 34 to the drum 31, and the sheet P is attracted to and borne on the drum 31 by the suction airflows generated by the suction device. As the drum 31 rotates, the sheet P is conveyed.

The liquid discharger 32 includes discharge units 33 (discharge units 33A to 33D) as liquid dischargers to discharge liquids. For example, the discharge unit 33A discharges a liquid of cyan (C), the discharge unit 33B discharges a liquid of magenta (M), the discharge unit 33C discharges a liquid of yellow (Y), and the discharge unit 33D discharges a liquid of black (K), respectively. Further, the discharge units may discharge a special liquid, that is, a liquid of spot color such as white, gold, or silver.

The discharge unit 33 is a full line head and includes multiple heads 100 arranged in a staggered manner on a base 331 as illustrated in FIG. 2, for example. Each of the heads 100 includes multiple nozzle arrays and multiple nozzles 104 arranged in each of the multiple nozzle arrays.

A discharge operation of each of the discharge units 33 of the liquid discharger 32 is controlled by a drive signal corresponding to print data. When the sheet P borne on the drum 31 passes through a region facing the liquid discharger 32, the liquids of respective colors are discharged from the discharge units 33 toward the sheet P, and an image corresponding to the print data is formed on the sheet P.

The drying unit 40 dries the liquid adhering onto the sheet P by the printing unit 30. Thus, the liquid component such as water in the liquid evaporates, the colorant contained in the liquid is fixed onto the sheet P, and curling of the sheet P is reduced.

A reversing mechanism 60 is a mechanism that reverses the sheet P by a switchback method when double-sided printing is performed on the sheet P having passed the drying unit 40. The reversed sheet P is fed backward through a transport path 61 of the printing unit 30 to the upstream side of the transfer cylinder 34.

The ejection unit 50 includes an ejection tray 51 on which the sheets P are stacked. The sheets P conveyed through the reversing mechanism 60 from the drying unit 40 is sequentially stacked and held on the ejection tray 51.

Figure 3:
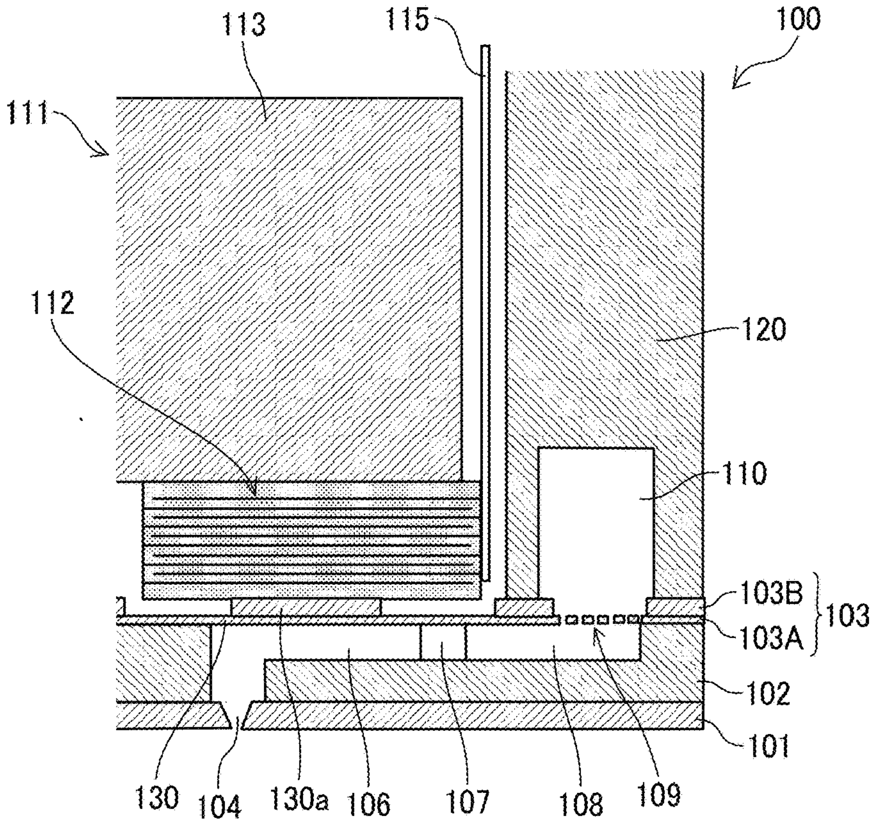
FIG. 3 is a cross-sectional view of an example of a head in a direction perpendicular to a nozzle array direction.
Figure 4:
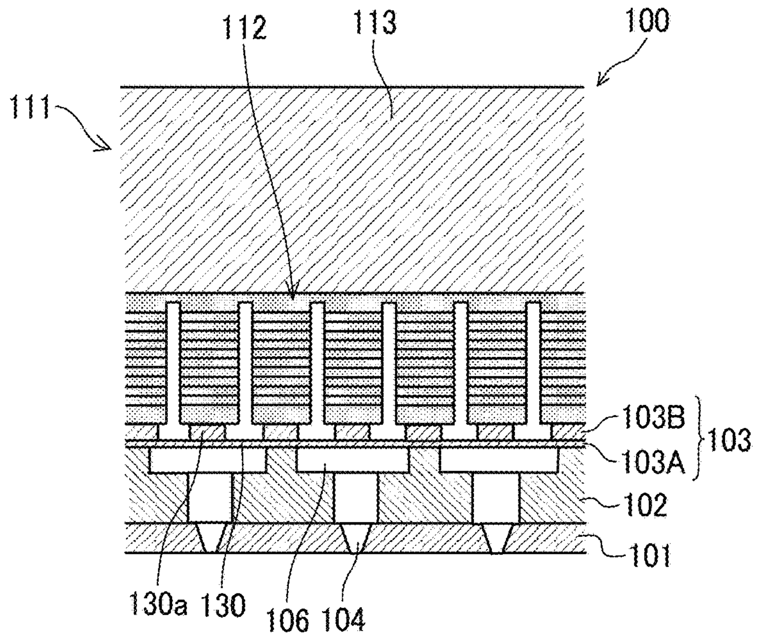
FIG. 4 is a cross-sectional view along the nozzle array direction.

Next, an example of the head 100 is described referring to FIGS. 3 and 4. FIG. 3 is a cross-sectional view of the head in a direction perpendicular to a nozzle array direction, and FIG. 4 is a cross-sectional view along the nozzle array direction.

The head 100 according to the present embodiment includes a nozzle plate 101, a channel plate 102 as an individual channel member, and a diaphragm member 103 as a wall that are laminated one on another and bonded to each other. The head 100 includes a piezoelectric actuator 111 that displaces the vibration region 130 (diaphragm) of the diaphragm member 103 and a common channel member 120 that also serves as a frame member of the head.

The nozzle plate 101 includes multiple nozzle arrays in which multiple nozzles 104 is arrayed to discharge the liquid.

The channel plate 102 includes multiple pressure chambers 106, multiple individual-supply channels 107, and multiple intermediate-supply channels 108. The multiple pressure chambers communicates with the multiple nozzles 104, respectively. The multiple individual-supply channels 107 also serves as fluid restrictors communicating with the multiple pressure chambers 106, respectively. The intermediate-supply channels 108 communicate with two or more of the multiple individual-supply channels 107. The intermediate-supply channel 108 serves as a liquid introduction unit.

The diaphragm member 103 includes the multiple vibration regions 130 (displaceable diaphragms) forming the wall of the pressure chamber 106 of the channel plate 102. Here, the diaphragm member 103 has a two-layer structure and includes a first layer 103A forming a thin portion and a second layer 103B forming a thick portion in this order from a side facing the channel plate 102. Note that the structure of the diaphragm member is not limited to such a two-layer structure and may be any suitable layer structure.

The displaceable vibration region 130 is formed in a portion corresponding to the pressure chamber 106 in the first layer 103A that is a thin portion. In the vibration region 130, a convex portion 130*a* is formed as a thick portion joined to the piezoelectric actuator 111 in the second layer 103B.

Then, on the opposite side of the diaphragm member 103 from the pressure chamber 106, the piezoelectric actuator 111 is provided, which includes an electromechanical conversion element as a driver (actuator, pressure generator) to deform the vibration region 130 of the diaphragm member 103.

The piezoelectric actuator 111 includes a piezoelectric member bonded on a base 113. The piezoelectric member is groove-processed by half cut dicing so that each piezoelectric elements 112 includes a desired number of pillar-shaped piezoelectric elements that are arranged in certain intervals to have a comb shape in the nozzle array direction. Then, the piezoelectric elements 112 are joined, one at a time, to the convex portion 130*a*, which is a thick-walled portion formed in the vibration region 130 of the diaphragm member 103.

The piezoelectric element 112 includes piezoelectric layers and internal electrodes alternately laminated on each other. Each internal electrode is led out to an end surface and connected to an external electrode (end surface electrode). The external electrode is connected to a flexible wiring member 115.

The common channel member 120 defines a common-supply channel 110. The common-supply channel 110 communicates with the intermediate-supply channel 108, which serves as a liquid introduction portion, through an opening 109, which also serves as a filter portion provided in the diaphragm member 103, and communicates with the individual-supply channel 107 via the intermediate-supply channel 108.

In the head 100, for example, the voltage to be applied to the piezoelectric element 112 is lowered from a reference potential (intermediate potential) so that the piezoelectric element 112 contracts to pull the vibration region 130 of the diaphragm member 103 to increase a volume of the pressure chamber 106. As a result, the liquid flows into the pressure chamber 106.

When the voltage applied to the piezoelectric element 112 is raised, the piezoelectric element 112 expands in a direction of lamination of the piezoelectric element 112. The vibration region 130 of the diaphragm member 103 deforms in a direction toward the nozzle 104 and contracts the volume of the pressure chambers 106. As a result, the liquid in the pressure chambers 106 is squeezed out of the nozzle 104.

Figure 5:
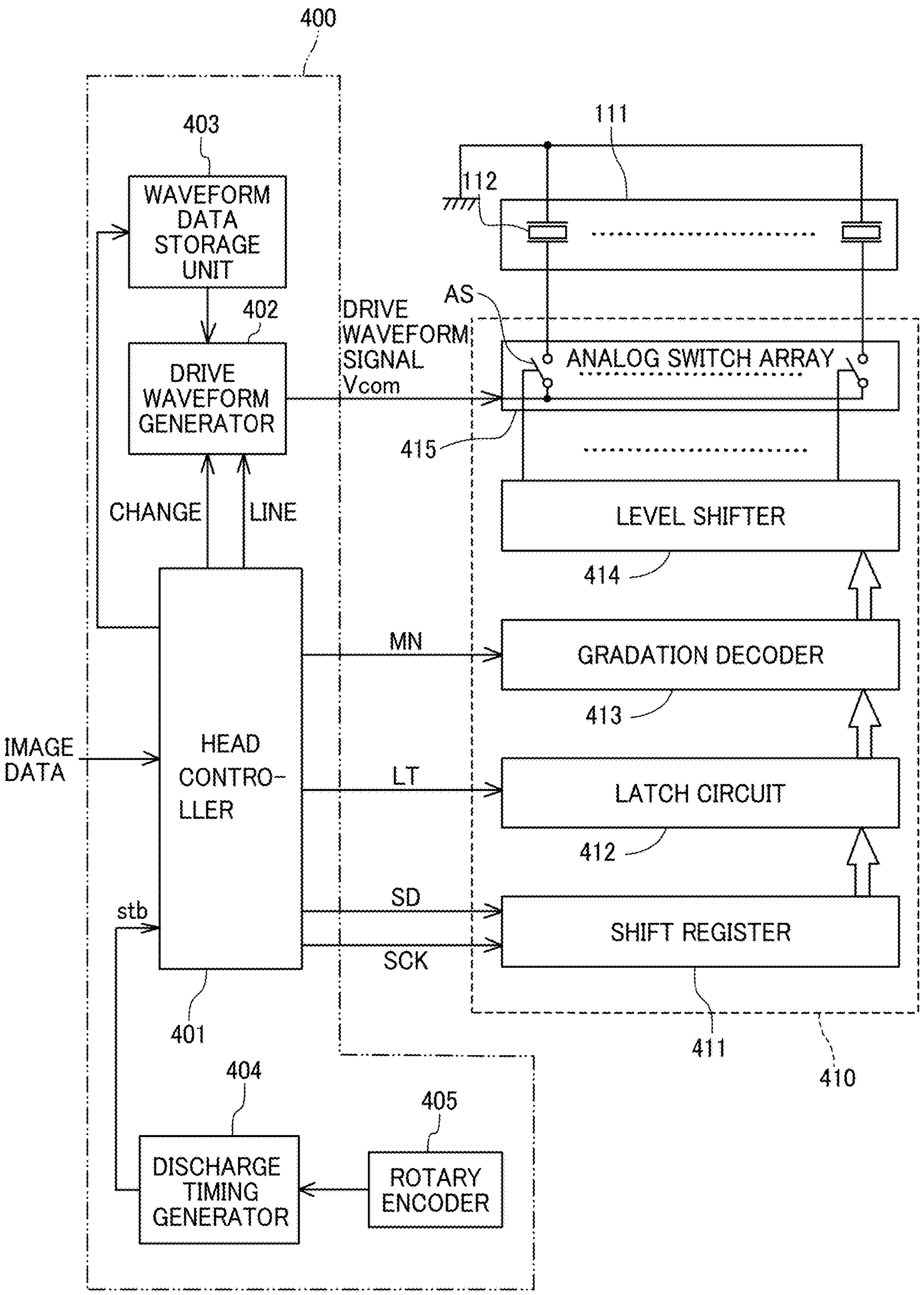
FIG. 5 is a block diagram of a portion related to a head drive control device of the printer.

Next, a portion related to a head drive control device that drives the head is described referring to a block diagram of FIG. 5.

The head drive control device 400, which applies drive waveforms to the head 100, includes a head controller 401, a drive waveform generator 402 and a waveform data storage unit 403, which include a drive waveform generator as a drive waveform generation device according to the present embodiment, a head driver 410, and a discharge timing generator 404 that generates the discharge timing.

In response to a reception of a discharge timing pulse stb, the head controller 401 outputs a discharge synchronization signal LINE that triggers generation of a drive waveform, to the drive waveform generator 402. The head controller 401 outputs a discharge timing signal CHANGE to the drive waveform generator 402. The discharge timing signal CHANGE corresponds to an amount of delay from the discharge synchronization signal LINE.

The drive waveform generator 402 generates a common drive waveform signal Vcom in timing based on the discharge synchronous signal LINE and the discharge timing signal CHANGE.

The head controller 401 receives image data and generates a mask control signal MN based on the image data. The mask control signal MN is used for selecting a predetermined waveform of the common drive waveform signal Vcom corresponding to the size of the liquid droplet to be discharged from each of the nozzles 104 of the head 100. The mask control signal MN is a signal in timing synchronized with the discharge timing signal CHANGE.

The head controller 401 transmits image data SD, a synchronization clock signal SCK, a latch signal LT instructing latch of the image data, and the generated mask control signal MN to the head driver 410.

The head driver 410 includes a shift register 411, a latch circuit 412, a gradation decoder 413, a level shifter 414, and an analog switch array 415.

The shift register 411 receives (inputs) the image data SD and the synchronization clock signal SCK transmitted from the head controller 401. The latch circuit 412 latches each resister value received from the shift register 411 by the latch signal LT transmitted from the head controller 401.

The gradation decoder 413 decodes a value (the image data SD) latched by the latch circuit 412 and the mask control signal MN and outputs a result. The level shifter 414 converts a level of a logic level voltage signal of the gradation decoder 413 to a level at which an analog switch AS of the analog switch array 415 is operable.

The analog switch AS of the analog switch array 415 is turned on or off by an output from the gradation decoder 413 received via the level shifter 414. The analog switch AS is provided for each of the nozzles 104 of the head 100 and is coupled to an individual electrode of the piezoelectric element 112 corresponding to each of the nozzles 104. The common drive waveform signal Vcom from the drive waveform generator 402 is input to the analog switch AS. A timing of the mask control signal MN is synchronized with a timing of the common drive waveform signal Vcom as described above.

Therefore, the analog switch AS is turned on or off in the appropriate timing in accordance with the output of the gradation decoder 413 applied via the level shifter 414 so that the drive pulse applied to the piezoelectric element 112 corresponding to each of the nozzles 104 is selected from the drive pulses included in the common drive waveform signal Vcom. As a result, the size of the liquid droplet discharged from the nozzle 104 is controlled.

The discharge timing generator 404 generates and outputs the discharge timing pulse stb each time the sheet P is moved by a predetermined amount based on a detection result of a rotary encoder 405 that detects a rotation amount of the drum 31. The rotary encoder 405 includes an encoder wheel rotating together with the drum 31 and an encoder sensor that reads a slit of the encoder wheel.

Figure 6:
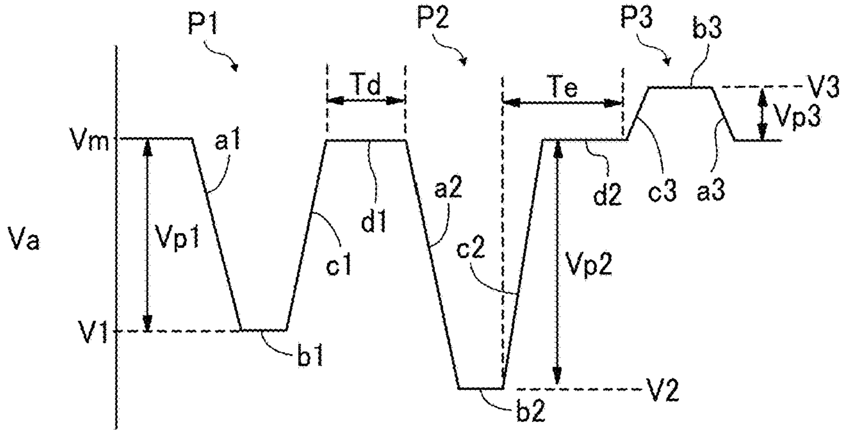
FIG. 6 is a diagram illustrating a drive waveform according to the first embodiment of the present disclosure.

Next, the drive waveform according to the first embodiment of the present disclosure is described referring to FIG. 6. FIG. 6 is a diagram illustrating the drive waveform according to the first embodiment.

A drive waveform Va according to the present embodiment includes, successively in time series, a non-discharge pulse P1, a discharge pulse P2, and a first waveform P3 as multiple drive pulses. The discharge pulse P2 may be also referred to as a "latter discharge pulse", and the first waveform P3 may be also referred to as a "contraction waveform". The non-discharge pulse P1 is a first drive pulse that pressurizes the liquid in the pressure chamber 106 to such a degree that the liquid is not discharged. The non-discharge pulse P1 includes an expansion waveform element a1 that expands the pressure chamber 106, a holding waveform element b1 that holds the state expanded by the expansion waveform element a1, and a contraction waveform element c1 that contracts the pressure chamber 106 from the state held by the holding waveform element b1.

The expansion waveform element a1 of the non-discharge pulse P1 is a waveform that falls from an intermediate potential (or reference potential) Vm to a potential V1. The holding waveform element b1 is a waveform that holds the potential V1. The contraction waveform element c1 is a waveform that rises from the potential V1 to the intermediate potential Vm. The non-discharge pulse P1 has a wave height value Vp1.

The discharge pulse P2 is a second drive pulse that discharges the liquid in the pressure chamber 106. The discharge pulse P2 includes an expansion waveform element a2 that expands the pressure chamber 106, a holding waveform element b2 that holds the state expanded by the expansion waveform element a2, and a contraction waveform element c2 that contracts the pressure chamber 106 from the state held by the holding waveform element b2.

The expansion waveform element a2 of the discharge pulse P2 is a waveform that falls from the intermediate potential (or reference potential) Vm to a potential V2. The holding waveform element b2 is a waveform that holds the potential V2. The contraction waveform element c2 is a waveform that rises from the potential V2 to the intermediate potential Vm. The discharge pulse P2 has a wave height value Vp2 (Vp2>Vp1).

The waveform from the end of the contraction waveform element c1 of the non-discharge pulse P1 to the start of the expansion waveform element a2 of the discharge pulse P2 is a pulse-to-pulse holding waveform element d1. The pulse-to-pulse holding waveform element d1 has a time Td. The time Td is the interval between the non-discharge pulse P1 and the discharge pulse P2.

When the reference character Tc represents the resonance period (natural vibration period) of the pressure chamber 106 of the head 100, the time Td between the non-discharge pulse P1 and the discharge pulse P2 is ⅔ to 4/3 times the resonance period Tc.

The wave height value Vp1 of the non-discharge pulse P1 is within ±10% of a wave height value Vpp1 of the non-discharge pulse P1 when a droplet velocity Vj of the liquid discharged by applying the non-discharge pulse P1 and the discharge pulse P2 to the head 100 reaches the minimum value.

These configurations may suppress satellite droplets discharged by the discharge pulse P2.

The first waveform P3 is a waveform that suppresses the residual vibration accompanied by liquid discharge by the discharge pulse P2. Suppressing the residual vibration means that the residual vibration of the meniscus when the first waveform P3 is applied after the contraction waveform element c2 of the discharge pulse P2 contracts the pressure chamber 106 to discharge the liquid is smaller than that when the first waveform P3 is not applied.

The first waveform P3 includes a contraction waveform element c3 that contracts the pressure chamber 106, a holding waveform element b3 that holds the state contracted by the contraction waveform element c3, and an expansion waveform element a3 that expands the pressure chamber 106 from the state held by the holding waveform element b3.

According to the present embodiment, the first waveform P3 is a pulse waveform, but for example the first waveform P3 may exclude the expansion waveform element a3 and include the contraction waveform element c3 and the holding waveform element b3 as long as the first waveform P3 includes at least the contraction waveform element c3.

The contraction waveform element c3 of the first waveform P3 is a waveform that rises from the intermediate potential (or reference potential) Vm to a potential V3 to contract the pressure chamber 106. The contraction waveform element c3 is also a waveform element that further contracts the pressure chamber 106 contracted by the contraction waveform element c2 of the discharge pulse P2.

The holding waveform element b3 of the first waveform P3 is a waveform that holds the potential V3. The expansion waveform element a3 is a waveform that falls from the potential V3 to the intermediate potential Vm. The first waveform P3 has a wave height value Vp3 (Vp3>Vm).

The waveform from the end of the contraction waveform element c2 of the discharge pulse P2 to the start of the contraction waveform element c3 of the first waveform P3 is a pulse-to-pulse holding waveform element d2.

The reference character "Te" represents the time from the start of the contraction waveform element c2 of the discharge pulse P2 to the start of the contraction waveform element c3 of the first waveform P3. The time Te is ±1/6 to 5/6 times the resonance period Tc.

As described above, after the discharge pulse P2, the contraction waveform element c3 of the first waveform P3 is provided to further contract the pressure chamber 106 contracted by the contraction waveform element c2 of the discharge pulse P2. Further, the time Te from the start of the contraction waveform element c2 of the discharge pulse P2 to the start of the contraction waveform element c3 of the first waveform c3 is ±1/6 to 5/6 times the resonance period Tc. This may suppress the occurrence of mist.

The effect of the present embodiment is described below in detail referring to FIG. 7 and the subsequent figures.

Figure 7:
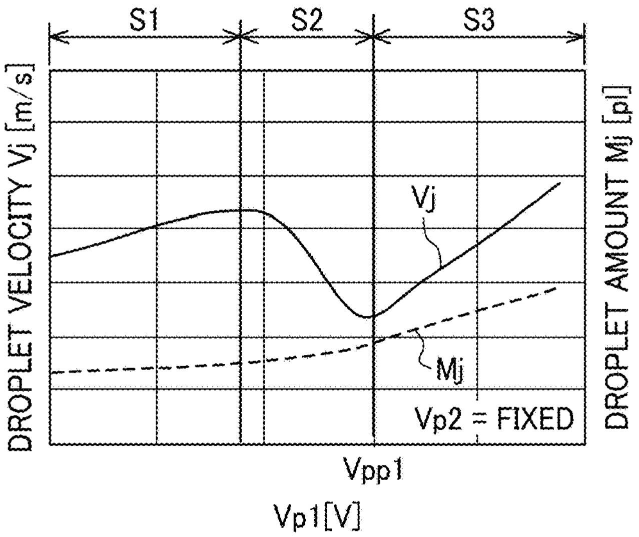
FIG. 7 is a graph illustrating an example of changes in a droplet velocity and a droplet amount when a wave height value of a non-discharge pulse is changed.

First, FIG. 7 illustrates an example of the changes in the droplet velocity Vj and a droplet amount Mj when the wave height value Vp2 of the discharge pulse P2 is set as a fixed value and the wave height value Vp1 of the non-discharge pulse P1 is changed. The time Td between the non-discharge pulse P1 and the discharge pulse P2 is 3/3 times the resonance period Tc (=the resonance period Tc).

Based on the results in FIG. 7, there may be three ranges S1, S2, and S3 that are roughly divided according to the wave height value Vp1.

Specifically, when the wave height value Vp1 of the non-discharge pulse P1 falls within the range S1, the droplet velocity Vj increases with the increasing wave height value Vp1. This indicates that the larger the wave height value Vp1 of the non-discharge pulse P1, the larger the meniscus vibration, which consequently increases the droplet velocity Vj of droplets by the discharge pulse P2.

When the wave height value Vp1 of the non-discharge pulse P1 falls within the range S2, the droplet velocity Vj decreases from the local maximum value at the boundary between the range S1 and the range S2. This indicates the state where the meniscus vibration has become too large and exceeded the simple harmonic motion of the meniscus, i.e., the liquid is going to spill over. As the liquid is going to spill over, the energy by the discharge pulse P2 is not efficiently transmitted, and the droplet velocity Vj is reduced.

When the wave height value Vp1 of the non-discharge pulse P1 falls within the range S3, the droplet velocity Vj increases from the local minimum value at the boundary between the range S2 and the range S3 (the wave height value Vp1 at this point is the peak wave height value Vpp1).

It can be seen that, while the droplet amount Mj increases at a constant slope in the range S1 and the range S2, the slope is large in the range S3. This indicates that the voltage of the wave height value Vp1 of the non-discharge pulse P1 has become too large, and therefore the droplets have started to be discharged even by the non-discharge pulse P1 itself (in this case, the non-discharge pulse P1 is actually a discharge pulse).

That is, as the droplets are discharged by the non-discharge pulse P1, the discharge pulse P2 causes discharge due to the normal resonance, and the droplet velocity Vj increases with the increasing wave height value Vp1. Also, the droplets are discharged by both the non-discharge pulse P1 and the discharge pulse P2, and therefore the slope of the droplet amount Mj is also larger than those in the range S1 and the range S2.

Figure 8:
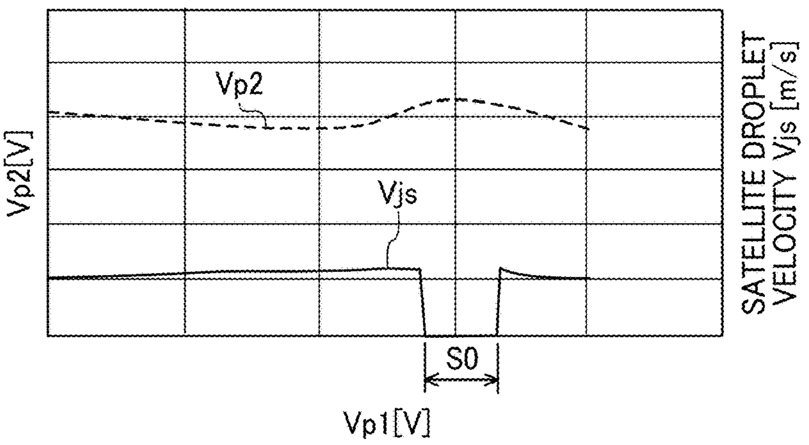
FIG. 8 is a graph illustrating an example of changes in satellite droplets when a wave height value of a discharge pulse is adjusted such that the droplet velocity is kept constant.

Next, FIG. 8 illustrates an example of the relationship between the wave height value Vp1 of the non-discharge pulse P1 and the wave height value Vp2 of the discharge pulse P2 when the droplet velocity Vj is kept constant. Here, the time interval Td between the non-discharge pulse P1 and the discharge pulse P2 is also the resonance period Tc.

As in the case of FIG. 7, there may be the three ranges S1, S2, and S3 that are divided according to the wave height value Vp1 of the non-discharge pulse P1.

First, in the range S1, as the wave height value Vp1 of the non-discharge pulse P1 increases, the wave height value Vp2 of the discharge pulse P2 tends to decrease. This indicates that, as the meniscus vibration also increases with the increasing wave height value Vp1 of the non-discharge pulse P1, the droplet velocity Vj may be kept constant even when the wave height value Vp2 of the discharge pulse P2 decreases.

In the range S2, the droplet velocity Vj increases from the local minimum value at the boundary between the range S1 and the range S2. This indicates the state where the meniscus vibration has become too large and exceeded the simple harmonic motion of the meniscus, i.e., the liquid is going to spill over. This indicates that, as the liquid is going to spill over, the energy by the discharge pulse P2 is not efficiently transmitted, and it is difficult to maintain the constant droplet velocity Vj unless a larger amount of energy is added.

In the range S3, the droplet velocity Vj decreases from the local maximum value at the boundary between the range S2 and the range S3. This also indicates, as in the results of FIG. 7 above, the droplets are discharged by the non-discharge pulse P1, and therefore the discharge pulse P2 causes discharge due to the normal resonance, the residual vibration increases with the increasing wave height value Vp1, and the droplet velocity Vj may be kept constant even when the wave height value Vp2 decreases.

Next, FIG. 8 illustrates an example of changes in satellite droplets when the wave height value Vp2 of the discharge pulse P2 is adjusted such that the droplet velocity Vj is kept constant.

A satellite droplet velocity Vjs slightly increases with the increasing wave height value Vp1 of the non-discharge pulse P1. However, there is a (satellite-less) region S0, in which the satellite droplet velocity Vjs is zero, around the wave height value Vp1 of the non-discharge pulse P1 corresponding to the vicinity where the wave height value Vp2 of the discharge pulse P2 reaches a local maximum value (the vicinity of the boundary between the ranges S2 and S3 above).

The above-described satellite-less region is obtained when the time Td between the non-discharge pulse P1 and the discharge pulse P2, which is the interval between the non-discharge pulse and the discharge pulse, is the same as the resonance period Tc. Therefore, the time Td is made different from the resonance period Tc, and in the same manner as that described above, the wave height value Vp2 of the discharge pulse P2 is adjusted so as to obtain the constant droplet velocity Vj, and the changes in satellite droplets with regard to the changes in the non-discharge pulse P1 are evaluated.

As a result, according to the present embodiment, a satellite-less region is observed when the time Td between the non-discharge pulse P1 and the discharge pulse P2 is 2/3 to 4/3 times the resonance period Tc.

Figure 9:
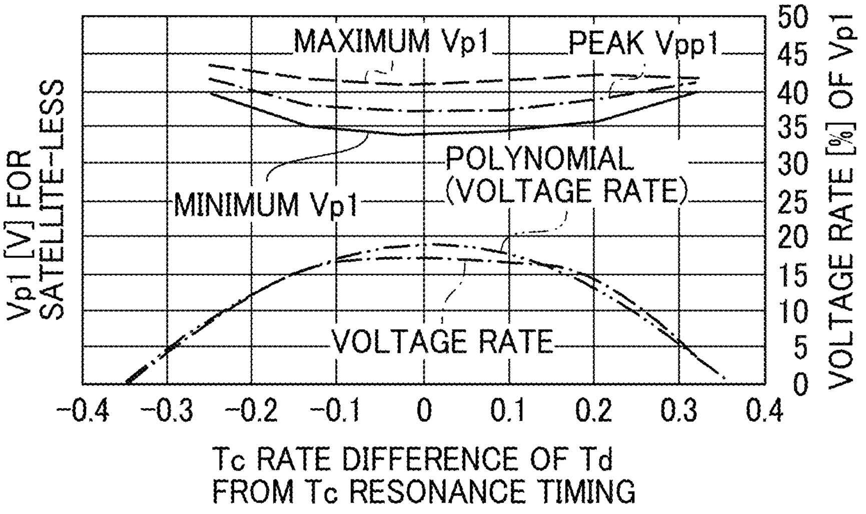
FIG. 9 is a graph illustrating an example of the relationship among the maximum value and the minimum value of the wave height value of the non-discharge pulse, which may obtain a satellite-less state, and the voltage rate thereof, and the time between the non-discharge pulse and the discharge pulse and the wave height value of the non-discharge pulse.
Figure 10:
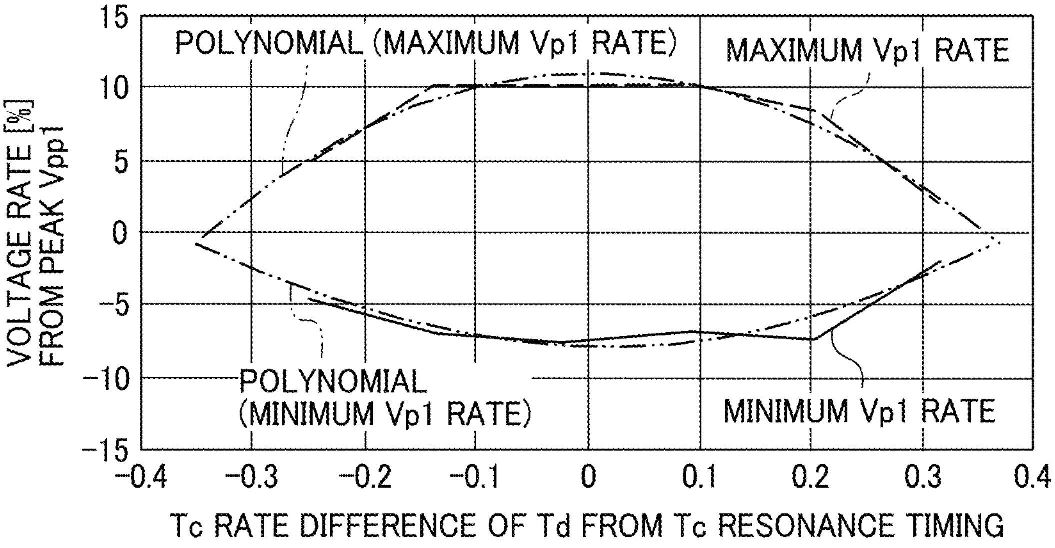
FIG. 10 is a graph illustrating an example of the time between the non-discharge pulse and the discharge pulse, which may obtain a satellite-less state, and the wave height value of the non-discharge pulse.

Next, the relationship among the time Td between the non-discharge pulse P1 and the discharge pulse P2, which may obtain a satellite-less state, the resonance period Tc, and the wave height value Vp1 of the non-discharge pulse P1 are described referring to FIGS. 9 and 10. FIG. 9 is a graph illustrating the relationship among the maximum value and the minimum value of the wave height value of the non-discharge pulse, which may obtain a satellite-less state, and the voltage rate thereof, and the time between the non-discharge pulse and the discharge pulse and the wave height value of the non-discharge pulse. FIG. 10 is a graph illustrating the time between the non-discharge pulse and the discharge pulse, which may obtain a satellite-less state, and the wave height value of the non-discharge pulse.

The horizontal axes in FIGS. 9 and 10 represent a Tc rate difference (Tc rate conversion) of the time Td between the non-discharge pulse P1 and the discharge pulse P2 from the resonance period Tc (resonance timing). For example, the Tc rate difference "0.1" represents the evaluation result in the time Td (Td=Tc+0.1Tc) that is longer than the time Td, which is the same as the resonance period Tc, by (0.1×Tc).

FIG. 9 illustrates the relationship among the maximum value (maximum Vp1) and the minimum value (minimum Vp1) of the wave height value Vp1 of the non-discharge pulse P1, which generates the satellite-less region S0, and the voltage rate thereof. Further, FIG. 9 collectively illustrates the maximum value and the minimum value of the wave height value Vp1 of the non-discharge pulse P1 that generates the satellite-less region S0 and the wave height value Vp1 (referred to as "peak wave height value Vpp1") when the wave height value Vp2 of the discharge pulse P2 reaches a peak (when the droplet velocity of the liquid discharged by the discharge pulse reaches a local minimum value).

FIG. 10 illustrates the voltage ranges of the maximum value (maximum Vp1) and the minimum value (minimum Vp1) of the wave height value Vp1 of the non-discharge pulse P1 by using the rate of the voltage difference from the peak wave height value Vpp1.

Thus, it can be seen that, as the time Td between the non-discharge pulse P1 and the discharge pulse P2 shifts from the resonance period Tc at the center, the voltage range of the wave height value Vp1 of the non-discharge pulse P1, which may obtain a satellite-less state, becomes narrower.

The time interval Td between the non-discharge pulse P1 and the discharge pulse P2, which may obtain a satellite-less state, is ⅔ to 4/3 times the resonance period Tc.

Furthermore, it can be seen that the non-discharge pulse P1 falls within ±10% of the peak wave height value Vpp1, which is the wave height value Vp1 of the non-discharge pulse P1 when the droplet velocity Vj of the liquid discharged by applying the discharge pulse P2 reaches the minimum value, i.e., the wave height value Vp2 of the discharge pulse P2 reaches a peak.

Hereinafter, "satellite-less waveform" refers to the waveform in which the non-discharge pulse P1 and the discharge pulse P2 are included, a time Td1 between the non-discharge pulse P1 and the discharge pulse P2 is ⅔ to 4/3 times the resonance period Tc, and the wave height value Vp1 of the non-discharge pulse P1 is within ±10% of the peak wave height value Vpp1 of the wave height value Vp1 of the non-discharge pulse P2 when the droplet velocity Vj discharged by applying the non-discharge pulse P1 and the discharge pulse P2 to the head 100 reaches the minimum value.

Figure 11:
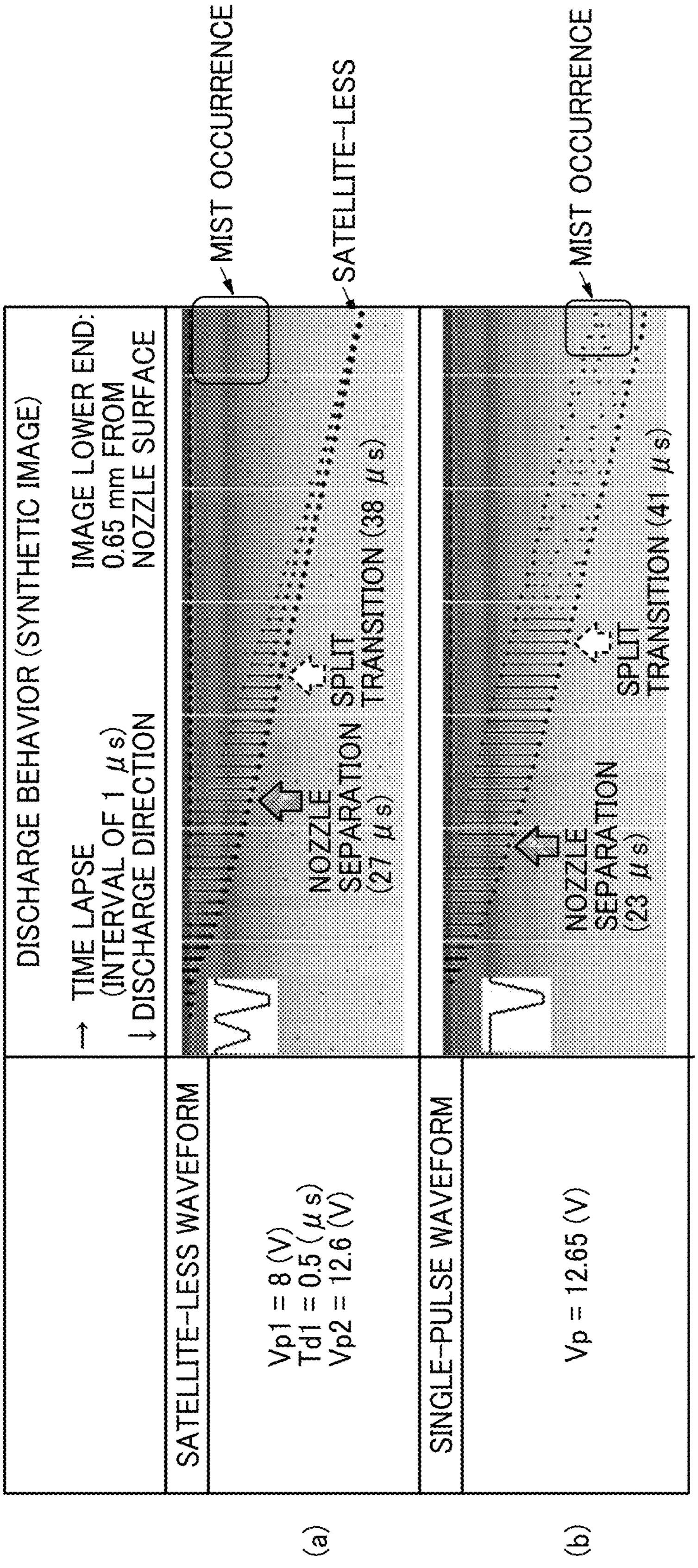
FIG. 11 is an explanatory diagram including an example of a synthetic image of a discharge state observed by a pulsed laser particulate device to describe a satellite suppression effect and mist occurrence by a satellite-less waveform.

Next, the suppression effect of the satellite and the occurrence of mist by the satellite-less waveform are also described referring to FIG. 11. FIG. 11 is an explanatory diagram including a synthetic image of the discharge state observed by a pulsed laser particulate device. FIG. 11(*a*) illustrates the case of the satellite-less waveform. FIG. 11(*b*) illustrates the case of the single-pulse waveform including only the discharge pulse P2 according to the first embodiment.

The pulsed laser particulate device may capture instantaneous states. Although the pulsed laser particulate device does not capture continuous states like a high-speed camera, the pulsed laser particulate device captures instantaneous states at delayed timings so as to clearly capture the state of the satellite, etc. FIG. 11 illustrates a synthetic image coupling the instantaneous images.

In the case of the single-pulse waveform, as illustrated in FIG. 11(*b*), the split transition begins in the vicinity of 41 μs, and then the satellite continue to occur, and the mist also occurs.

Conversely, in the case of the satellite-less waveform, as it is seen from FIG. 11(*a*) that the split transition begins in the vicinity of 38 μs, and then the satellite is absorbed by the primary droplet to thus obtain a satellite-less state, but the mist (microdroplets) occurs.

That is, the satellite-less waveform may suppress the satellite, but even with the satellite-less waveform, there is the remaining mist enough to be observed by the pulsed laser particulate device.

Figure 12A:
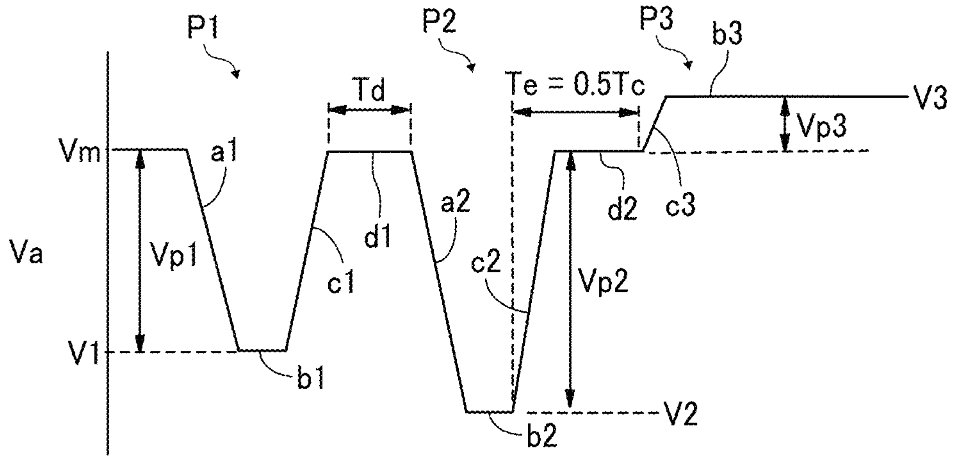
FIGS. 12A and 12B are diagrams illustrating examples of drive waveforms to describe a mist suppression effect by a contraction waveform element of a first waveform.
Figure 12B:
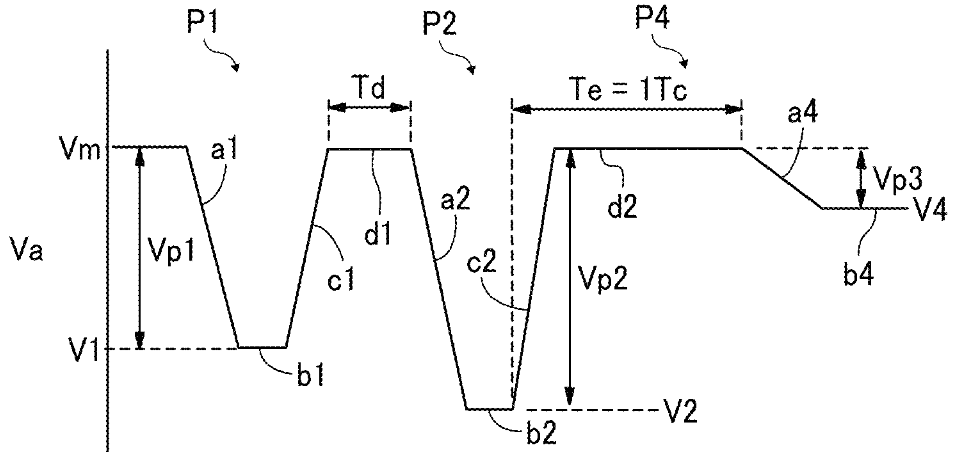
Figure 13:
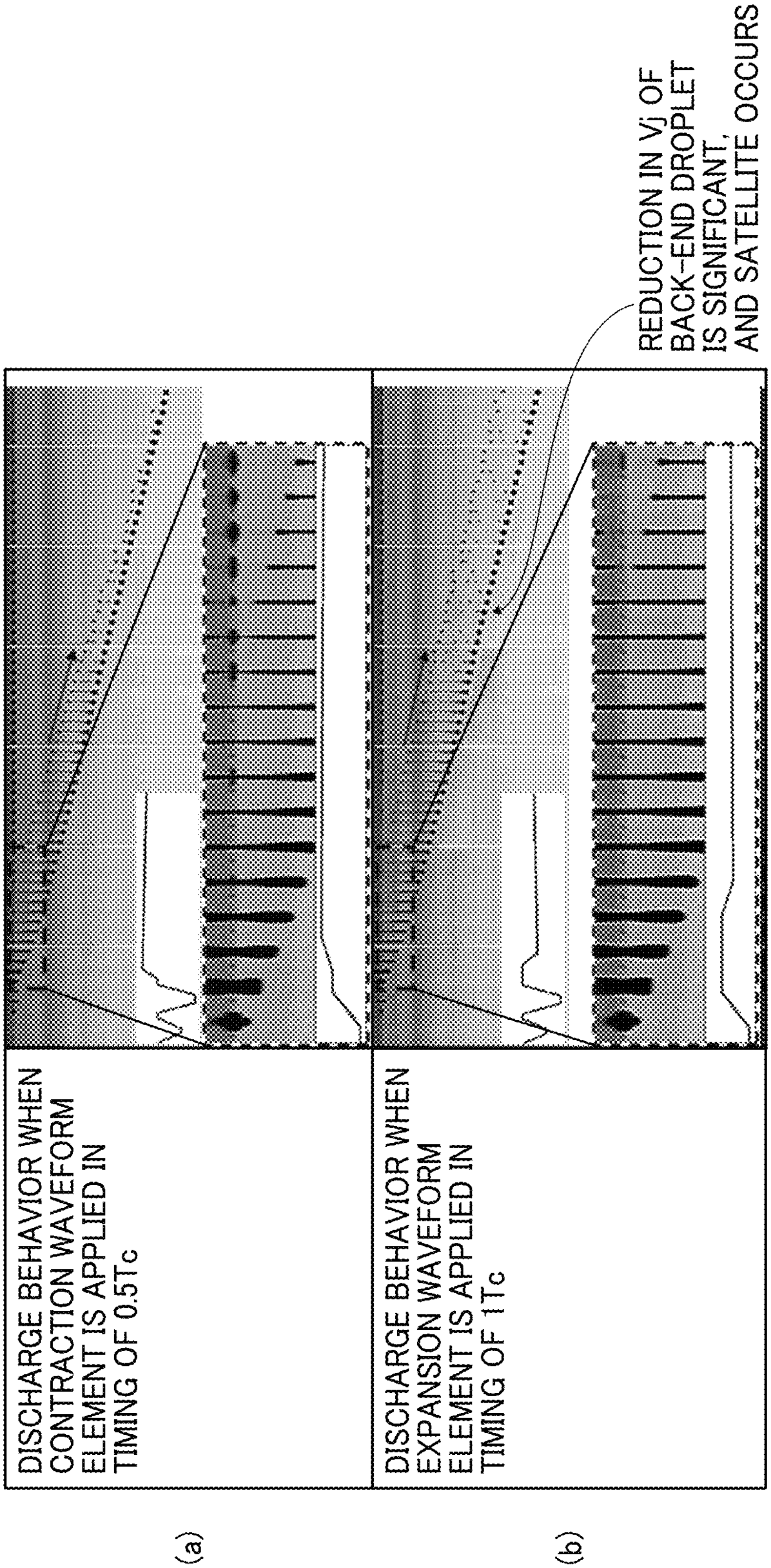
FIG. 13 is an explanatory diagram including an example of a synthetic image of a discharge state of a liquid discharged from a liquid discharge head when each of the drive waveforms in FIGS. 12A and 12B is applied, and the synthetic image is observed by the pulsed laser particulate device.

Next, the mist suppression effect of the contraction waveform element c3 of the first waveform P3 according to the present embodiment is described referring to FIGS. 12A, 12B, and 13. FIGS. 12A and 12B are graphs of drive waveforms to describe the mist suppression effect. FIG. 12A is a graph of the drive waveform in which a contraction waveform element is applied subsequent to a satellite waveform. FIG. 12B is a graph of the drive waveform in which an expansion waveform element is applied subsequent to a satellite waveform. FIG. 13 is an explanatory diagram including a synthetic image of the discharge state of the liquid discharged from the head when each of the drive waveforms in FIGS. 12A and 12B is applied. The synthetic image is observed by the pulsed laser particulate device.

Based on the result of FIG. 11 described above, it is assumed that the occurrence of mist by the satellite-less waveform is caused by the effect of residual vibration after the liquid discharge by the discharge pulse P2. Therefore, the drive waveforms illustrated in FIGS. 12A and 12B, in which the contraction waveform element or the expansion waveform element is applied subsequent to the discharge pulse P2, are applied to the head as the waveform to suppress the residual vibration, and the discharge state is observed.

In the drive waveform Va illustrated in FIG. 12A, as in the first embodiment, the first waveform P3 including the contraction waveform element c3 is provided subsequent to the discharge pulse P2. In the drive waveform Va, the first waveform P3 is not a pulse waveform, but includes the contraction waveform element c3 and the holding waveform element b3 that holds the potential V3.

The time Te from the start of the contraction waveform element c2 of the discharge pulse P2 to the start of the contraction waveform element c3 of the first waveform P3 is Te=tr+td2 where the reference character tr2 represents the rise time of the contraction waveform element c2 of the discharge pulse P2 and the reference character td2 represents the time of the holding waveform element d2.

In the drive waveform Va, the time Te from the start of the contraction waveform element c2 of the discharge pulse P2 to the start of the contraction waveform element c3 of the first waveform P3 is half the resonance period (0.5Tc=½ times the resonance period Tc). Thus, the contraction waveform element c3 of the first waveform P3 has the opposite phase with respect to the residual vibration of the pressure chamber 106.

In the drive waveform Vb illustrated in FIG. 12B, different from the first embodiment, the first waveform P4 including the expansion waveform element a4 is provided subsequent to the discharge pulse P2. In the drive waveform Vb, the first waveform P4 is also not a pulse waveform, but includes the expansion waveform element a4 that falls from the intermediate potential Vm to a potential V4 by the wave height value Vp3 and a holding waveform element b4 that holds the potential V4.

In the drive waveform Vb, the time Te from the start of the contraction waveform element c2 of the discharge pulse P2 to the start of the expansion waveform element c4 of the first waveform P4 is one resonance period (1Tc=one time the resonance period Tc). Thus, the expansion waveform element a4 of the first waveform P4 has the opposite phase with respect to the residual vibration of the pressure chamber 106.

When the drive waveform Va in FIG. 12A included in the drive waveforms described above is applied, it is confirmed that the satellite-less discharge state may be maintained while the occurrence of mist may be suppressed, as illustrated in FIG. 13(*a*).

Conversely, when the drive waveform Va illustrated in FIG. 12B is applied, the back-end droplet is not absorbed by the primary droplet due to a significant reduction in the droplet velocity of the back-end droplet, and thus the satellite occurs, and it is confirmed that there is no satellite-less effect, as illustrated in FIG. 13(*b*).

As described above, the contraction waveform element is applied in timing so as to have the opposite phase with respect to the residual vibration accompanied by the liquid discharge by the discharge pulse P2 so that the satellite and the mist may be suppressed.

Conversely, when the expansion waveform element is applied in timing so as to have the opposite phase with respect to the residual vibration accompanied by the liquid discharge by the discharge pulse P2, it is difficult to suppress the satellite.

Figure 14A:
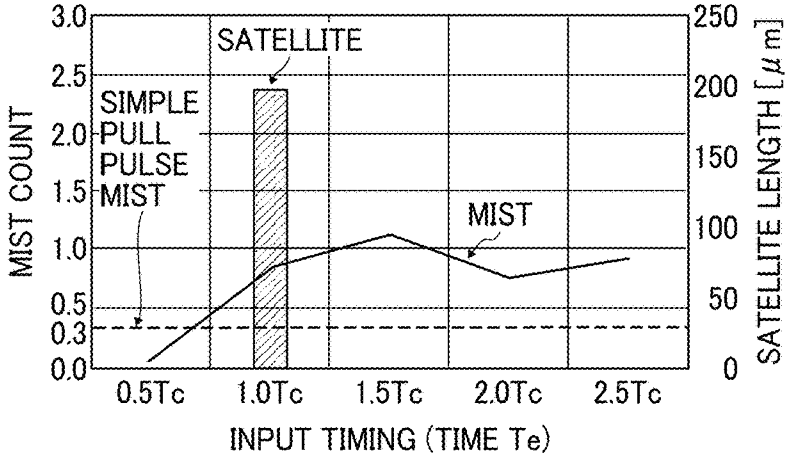
FIGS. 14A and 14B are graphs illustrating an example of the relationship among a time from the start of the contraction waveform element of the discharge pulse to the start of the first waveform, the amount of mist, and the satellite length.
Figure 14B:
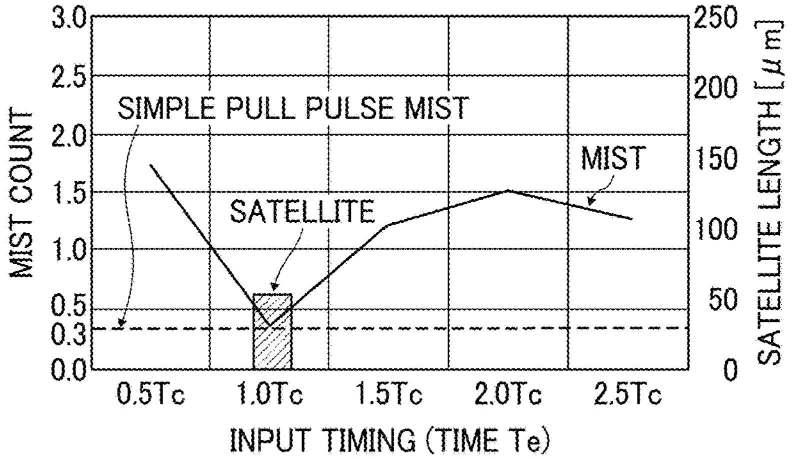

Next, the relationship among the time Te from the start of the contraction waveform element of the discharge pulse to the start of the first waveform, the amount of mist, and the satellite length is described referring to FIGS. 14A and 14B. FIGS. 14A and 14B are graphs illustrating the relationship. FIG. 14A illustrates the case where the drive waveform Va is applied. FIG. 14B illustrates the case where the drive waveform Vb is applied.

In FIGS. 14A and 14B, the mist count is a value normalized by the satellite-less waveform, and the amount of mist is 0.3 in the case of a simple pull pulse.

As described above, with respect to the resonance period Tc of the pressure chamber 106, the opposite-phase vibration suppression timing comes after half the resonance period (0.5Tc) in the case of the contraction waveform element c3 of the drive waveform Va. The opposite-phase vibration suppression timing comes after one resonance period (1Tc) in the case of the expansion waveform element a4 of the drive waveform Vb.

When the drive waveform Va is applied, as illustrated in FIG. 14A, the amount of mist has the minimum value in the vibration suppression timing (Te=0.5Tc). When the time Te is 1.0Tc or more, the amount of mist is larger than that in the case of a simple pull pulse. Furthermore, it can be seen that, when the time Te is 1.0Tc, the contraction by the contraction waveform element c3 is superimposed on the convex meniscus, and therefore the liquid is discharged by the first waveform P3, which results in the satellite.

When the drive waveform Va is applied, the start timing of the contraction waveform element c3 of the first waveform P3 falls within approximately 0.8Tc, i.e., within ⅓ from 0.5Tc that is the vibration suppression timing so that there may be a reduction from the amount of mist by a simple pull pulse.

In other words, the time Te from the start of the contraction waveform element c2 of the discharge pulse P2 to the start of the contraction waveform element c3 of the first waveform P3 is ±⅙ (=½−⅓) to ⅚ (½+⅓) times the resonance period Tc so that there may be a reduction from the amount of mist by a simple pulse.

Conversely, when the drive waveform Vb is applied, as illustrated in FIG. 14B, the amount of mist has a minimum value in the vibration suppression timing (Te=1Tc), but the satellite occurs. Further, there is no effect of mist suppression in timing other than 1Tc in the time Te.

As described above, according to the present embodiment, the drive waveform Va is applied, in which the interval Td between the non-discharge pulse P1 and the discharge pulse P2 is ⅔ to 4/3 of the resonance period Tc of the pressure chamber 106, the wave height value Vp1 of the non-discharge pulse P1 falls within ±10% of the peak wave height value Vpp1 by which the droplet velocity Vj of the liquid discharged by the discharge pulse P2 reaches a local minimum value, and the interval Te from the start of the contraction waveform element c2 of the discharge pulse P2 to the start of the contraction waveform element c3 of the first waveform P3 is ±⅙ to ⅚ times the resonance period Tc of the pressure chamber 106. Thus, the satellite and the mist may be suppressed.

The drive waveform generation device according to the present embodiment generates the drive waveform Va. The drive waveform Va includes, successively in time series, the non-discharge pulse P1 that does not discharge the liquid, the discharge pulse P2 including the contraction waveform element c2 that contracts the pressure chamber 106 to discharge the liquid, and the first waveform P3 including the contraction waveform element c3 that contracts the pressure chamber 106. The interval Td between the non-discharge pulse P1 and the discharge pulse P2 is ⅔ to 4/3 of the resonance period Tc of the pressure chamber 106. The wave height value Vp1 of the non-discharge pulse P1 falls within ±10% of the peak wave height value Vpp1 by which the droplet velocity Vj of the liquid discharged by the discharge pulse P2 reaches a local minimum value. The interval Te from the start of the contraction waveform element c2 of the discharge pulse P2 to the start of the contraction waveform element c3 of the first waveform P3 is ±⅙ to ⅚ times the resonance period Tc of the pressure chamber 106.

The head drive method according to the present embodiment is to generate the drive waveform Va and apply the drive waveform Va to the head to discharge the liquid. The drive waveform Va includes, successively in time series, the non-discharge pulse P1 that does not discharge the liquid, the discharge pulse P2 including the contraction waveform element c2 that contracts the pressure chamber 106 to discharge the liquid, and the first waveform P3 including the contraction waveform element c3 that contracts the pressure chamber 106. The interval Td between the non-discharge pulse P1 and the discharge pulse P2 is ⅔ to 4/3 of the resonance period Tc of the pressure chamber 106. The wave height value Vp1 of the non-discharge pulse P1 falls within ±10% of the peak wave height value Vpp1 by which the droplet velocity Vj of the liquid discharged by the discharge pulse P2 reaches a local minimum value. The interval Te from the start of the contraction waveform element c2 of the discharge pulse P2 to the start of the contraction waveform element c3 of the first waveform P3 is ±⅙ to ⅚ times the resonance period Tc of the pressure chamber 106.

Figure 15:
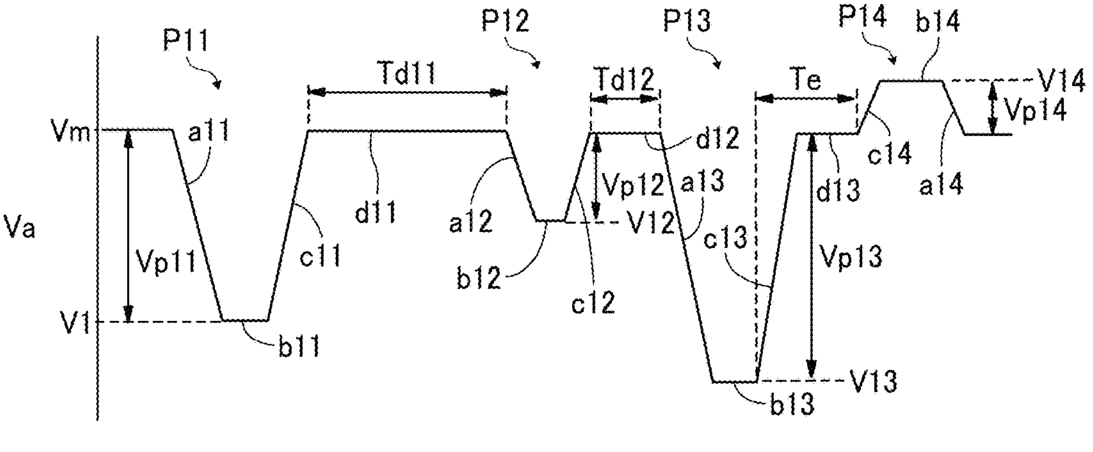
FIG. 15 is a diagram illustrating a drive waveform according to a second embodiment of the present disclosure.

Next, the drive waveform according to the second embodiment of the present disclosure is described referring to FIG. 15. FIG. 15 is a diagram illustrating the drive waveform according to the second embodiment.

The drive waveform Va according to the present embodiment includes, successively in time series, a first discharge pulse P11, a non-discharge pulse P12, a second discharge pulse P13, and a first waveform P14 as multiple drive pulses. The first discharge pulse P11 is an example of a former discharge pulse, the second discharge pulse P12 is an example of a latter discharge pulse 3, and the first waveform P14 is an example of a contraction waveform.

The first discharge pulse P11 may be also referred to as a "former discharge pulse", and the second discharge pulse P12 may be also referred to as a "latter discharge pulse", The first discharge pulse P11 is a first drive pulse that pressurizes the liquid in the pressure chamber 106 to discharge the liquid. The first discharge pulse P11 includes an expansion waveform element a11 that expands the pressure chamber 106, a holding waveform element b11 that holds the state expanded by the expansion waveform element a11, and a contraction waveform element c11 that contracts the pressure chamber 106 from the state held by the holding waveform element b11 to discharge the liquid.

The expansion waveform element a11 of the first discharge pulse P11 is a waveform that falls from the intermediate potential (or reference potential) Vm to a potential V11. The holding waveform element b11 is a waveform that holds the potential V11. The contraction waveform element c11 is a waveform that rises from the potential V11 to the intermediate potential Vm. The first discharge pulse P11 has a wave height value Vp11.

The non-discharge pulse P12 is a second drive pulse that is usable as a micro-drive waveform to pressurize the liquid in the pressure chamber 106 enough to vibrate the meniscus without discharging the liquid. The non-discharge pulse P12 includes an expansion waveform element a12 that expands the pressure chamber 106, a holding waveform element b12 that holds the state expanded by the expansion waveform element a12, and a contraction waveform element c12 that contracts the pressure chamber 106 from the state held by the holding waveform element b12 to vibrate the meniscus.

The expansion waveform element a12 of the non-discharge pulse P12 is a waveform that falls from the intermediate potential (or reference potential) Vm to a potential V12 (V12<V11). The holding waveform element b12 is a waveform that holds the potential V12. The contraction waveform element c12 is a waveform that rises from the potential V12 to the intermediate potential Vm. The non-discharge pulse P12 has a wave height value Vp12.

The second discharge pulse P13 is a third drive pulse that pressurizes the liquid in the pressure chamber 106 to discharge the liquid. The second discharge pulse P13 includes an expansion waveform element a13 that expands the pressure chamber 106, a holding waveform element b13 that holds the state expanded by the expansion waveform element a13, and a contraction waveform element c13 that contracts the pressure chamber 106 from the state held by the holding waveform element b13 to discharge the liquid.

The expansion waveform element a13 of the second discharge pulse P13 is a waveform that falls from the intermediate potential (or reference potential) Vm to a potential V13 (V13>V11). The holding waveform element b13 is a waveform that holds the potential V13. The contraction waveform element c13 is a waveform that rises from the potential V13 to the intermediate potential Vm. The second discharge pulse P13 has a wave height value Vp13.

The waveform from the end of the contraction waveform element c11 of the first discharge pulse P11 to the start of the expansion waveform element a12 of the non-discharge pulse P12 is a pulse-to-pulse holding waveform element d11. The pulse-to-pulse holding waveform element d11 has a time (time interval between the first discharge pulse P11 and the non-discharge pulse P12) Td11.

The waveform from the end of the contraction waveform element c12 of the non-discharge pulse P12 to the start of the expansion waveform element a13 of the second discharge pulse P13 is a pulse-to-pulse holding waveform element d12. The pulse-to-pulse holding waveform element d12 has a time (time interval between the non-discharge pulse P12 and the second discharge pulse P13) Td12.

The interval (the time Td11) between the first discharge pulse P11 and the non-discharge pulse P12 has a resonance relationship. The resonance relationship refers to the relationship in which the pressure applied to the liquid in the pressure chamber 106 by the first discharge pulse P11 is amplified by the residual vibration obtained when the pressure is applied to the liquid in the pressure chamber 106 by the non-discharge pulse P12.

Similarly, the interval (the time Td12) between the non-discharge pulse P12 and the second discharge pulse P13 has a resonance relationship. The resonance relationship refers to the relationship in which the pressure applied to the liquid in the pressure chamber 106 by the second discharge pulse P13 is amplified by the residual vibration obtained when the pressure is applied to the liquid in the pressure chamber 106 by the non-discharge pulse P12.

According to the present embodiment, the time Td12 between the non-discharge pulse P12 and the second discharge pulse P13 is ¾ to 5/4 times the resonance period Tc of the pressure chamber 106 in the head 100.

The wave height value Vp12 of the non-discharge pulse P12 falls within ±10% of the wave height value Vp12 (a peak wave height value Vpp12) of the non-discharge pulse P12 when the droplet velocity Vj of the liquid discharged by successively applying the first discharge pulse P11, the non-discharge pulse P12, and the second discharge pulse P13 reaches the minimum value.

These configurations may suppress the satellite of droplets discharged by the second discharge pulse P13.

The first waveform P14 is a pulse that suppresses the residual vibration accompanied by liquid discharge by the second discharge pulse P13. Suppressing the residual vibration means that the residual vibration of the meniscus when the first waveform P14 is applied after the contraction waveform element c13 of the second discharge pulse P13 contracts the pressure chamber 106 to discharge the liquid is smaller than that when the first waveform P14 is not applied.

The first waveform P14 includes a contraction waveform element c14 that contracts the pressure chamber 106, a holding waveform element b14 that holds the state contracted by the contraction waveform element c14, and an expansion waveform element a14 that expands the pressure chamber 106 from the state held by the holding waveform element b14.

According to the present embodiment, too, the first waveform P14 is a pulse waveform, but for example the first waveform P14 may exclude the expansion waveform element a14 and include the contraction waveform element c14 and the holding waveform element b14 as in FIG. 12A described above as long as the first waveform includes at least the contraction waveform element c14.

The contraction waveform element c14 of the first waveform P14 is a waveform that rises from the intermediate potential (or reference potential) Vm to a potential V14 to contract the pressure chamber 106. The contraction waveform element c14 is also a waveform element that further contracts the pressure chamber 106 contracted by the contraction waveform element c13 of the second discharge pulse P13.

The holding waveform element b14 of the first waveform P14 is a waveform that holds the potential V14. The expansion waveform element a14 is a waveform that falls from the potential V14 to the intermediate potential Vm. The first waveform P14 has a wave height value Vp14 (Vp14>Vm).

The waveform from the end of the contraction waveform element c13 of the second discharge pulse P13 to the start of the contraction waveform element c14 of the first waveform P14 is a pulse-to-pulse holding waveform element d13.

The reference character Te represents the time from the start of the contraction waveform element c13 of the second discharge pulse P13 to the start of the contraction waveform element c14 of the first waveform P14. The time Te is ±1/6 to 5/6 times the resonance period Tc.

As described above, after the second discharge pulse P13, the contraction waveform element c14 of the first waveform P14 is provided to further contract the pressure chamber 106 contracted by the contraction waveform element c13 of the second discharge pulse P13. Further, the time Te from the start of the contraction waveform element c13 of the second discharge pulse P13 to the start of the contraction waveform element c14 of the first waveform P14 is ±1/6 to 5/6 times the resonance period Tc. This may suppress the occurrence of mist.

Figure 16:
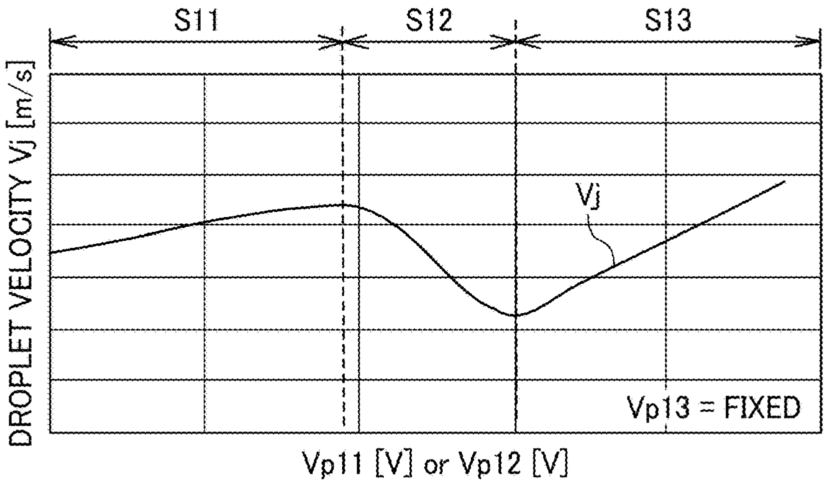
FIG. 16 is a graph illustrating an example of the relationship among the wave height values of the first discharge pulse and the non-discharge pulse and the droplet velocity according to the second embodiment.

Next, the effect of the satellite-less state according to the present embodiment is described in detail referring to FIG. 16 and the subsequent figures.

First, FIG. 16 illustrates an example of the changes in the droplet velocity Vj when the wave height value Vp13 of the second discharge pulse P13 is set as a fixed value and the wave height value Vp11 of the first discharge pulse P11 or the wave height value Vp12 of the non-discharge pulse P12 is changed. The first discharge pulse P11 and the non-discharge pulse P12 have a resonance timing relationship. The non-discharge pulse P12 and the second discharge pulse P13 have a resonance timing relationship.

Based on the results in FIG. 16, there may be three ranges S11, S12, and S13 that are roughly divided according to the wave height values Vp11 and Vp12.

Specifically, when the wave height value Vp11 of the first discharge pulse P11 or the wave height value Vp12 of the non-discharge pulse P12 falls within the range S11, the droplet velocity Vj increases with the increasing wave height value Vp11 or Vp12.

The wave height value Vp11 of the first discharge pulse P11 or the wave height value Vp12 of the non-discharge pulse P12 falls within the range S12, the droplet velocity Vj decreases from the local maximum value at the boundary between the range S11 and the range S12.

When the wave height value Vp11 of the first discharge pulse P11 or the wave height value Vp12 of the non-discharge pulse P12 falls within the range S13, the droplet velocity Vj increases from the local minimum value (the wave height values Vp11 and Vp12 at this point are the peak wave height values Vpp11 and Vpp12) at the boundary between the range S12 and the range S13.

In this case, when the wave height value Vp11 of the first discharge pulse P11 and the wave height value Vp12 of the non-discharge pulse P12 are voltages within ±10% of the wave height value Vpp11 and the wave height value Vpp12 by which the droplet velocity Vj reaches a local minimum value when the liquid is discharged after the first discharge pulse P11 is applied, then the non-discharge pulse P12 is applied, and further the second discharge pulse P13 is applied, the satellite droplet velocity is significantly increased and, under some conditions, the satellite is eliminated.

In other words, as can be seen from FIG. 16, according to the present embodiment, instead of the non-discharge pulse P12, the wave height value Vp11 of the first discharge pulse P11 is a voltage within ±10% of the wave height value Vpp11 by which the droplet velocity reaches a local minimum value when the liquid is discharged after the first discharge pulse P11 is applied, then the non-discharge pulse P12 is applied, and further the second discharge pulse P13 is applied so that the satellite may be eliminated under some conditions.

Specifically, it is considered that, as described above, the satellite droplet velocity significantly increases, and the satellite is eliminated under some conditions due to the fact that the discharge by the second discharge pulse P13 receives the discharge energy by the first discharge pulse P11 and the non-discharge pulse P12. Therefore, the discharge energy within ±10% of the wave height value by which the droplet velocity Vj reaches a local minimum value may be applied to either the non-discharge pulse P12 or the first discharge pulse P11.

The effect of using the first discharge pulse P11, the second discharge pulse P13, and the non-discharge pulse P12 is described here.

Figure 17:
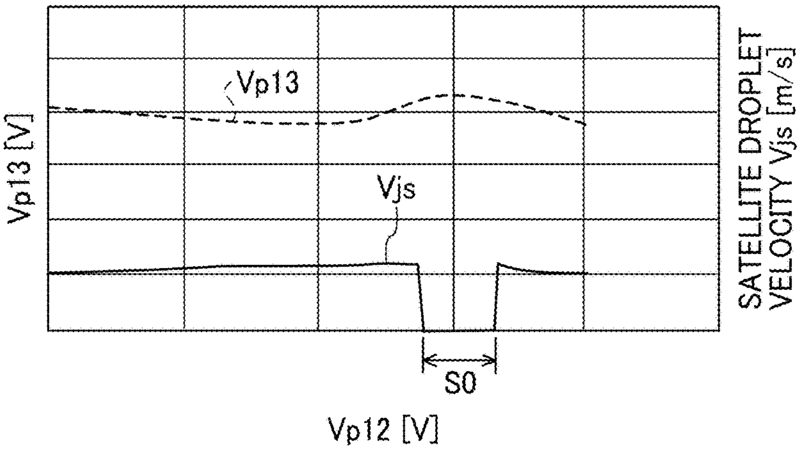
FIG. 17 is a graph illustrating an example of changes in the wave height value of the non-discharge pulse, the wave height value of the second discharge pulse, and the droplet velocity of the satellite droplets when the first discharge pulse is not used.

First, the suppression of the satellite by a pulse group including the non-discharge pulse P12 and the second discharge pulse P13 without using the first discharge pulse P11 as in the first embodiment above is described referring to FIG. 17.

FIG. 17 illustrates an example of the relationship between the wave height value Vp13 of the second discharge pulse P13 and the droplet velocity of the satellite droplet when the wave height value Vp13 of the second discharge pulse P13 is adjusted such that the droplet velocity Vj becomes constant with respect to the wave height value Vp12 of the non-discharge pulse P12.

The satellite droplet velocity Vjs slightly increases with the increasing wave height value Vp12 of the non-discharge pulse P12. However, there is the (satellite-less) region S0, in which the satellite droplet velocity Vjs is zero, around the wave height value Vp12 of the non-discharge pulse P12 corresponding to the vicinity where the wave height value Vp13 of the second discharge pulse P13 has the local maximum value (the vicinity of the boundary between the ranges S12 and S13).

The above-described satellite-less region is obtained when an interval Td2 between the non-discharge pulse P12 and the second discharge pulse P13 is the same as the resonance period Tc (Td2=Tc).

The condition for the wave height value Vp12 under which the satellite-less region may be observed is desirably the voltage value in the vicinity of the boundary between the range S12 and the range S13. In other words, it is desirable to apply the voltage in the vicinity of the boundary between the range S12 and th range S13. In the range S12, the meniscus vibration has become too large due to the non-discharge pulse P12, and the droplets are going to spill over. In the range S13, the droplets have started to be discharged by the non-discharge pulse P12 itself.

However, under the condition where the meniscus vibration is too large, it is difficult to use the non-discharge pulse P12 as a micro-drive waveform that is typically used to vibrate the meniscus to prevent drying. This is because the non-discharge pulse P12 having such a wave height value may cause the meniscus to be out of control and affect the subsequently discharged droplets or may cause a discharge failure, or the non-discharge pulse P12 (micro-drive waveform) itself may discharge droplets, which makes it difficult for the non-discharge pulse P12 to function as a micro-drive waveform.

Therefore, a dedicated non-discharge pulse for obtaining the satellite-less state is desirably provided to achieve both the satellite-less state and the micro-driving to prevent the meniscus from drying. That is, both the non-discharge pulse having a high wave height value (a high drive voltage) and the non-discharge pulse having a low drive voltage as a micro-drive waveform are desirably set in the drive waveform. As a result, the drive waveform length becomes longer, and it is difficult to increase the drive frequency.

Figure 18:
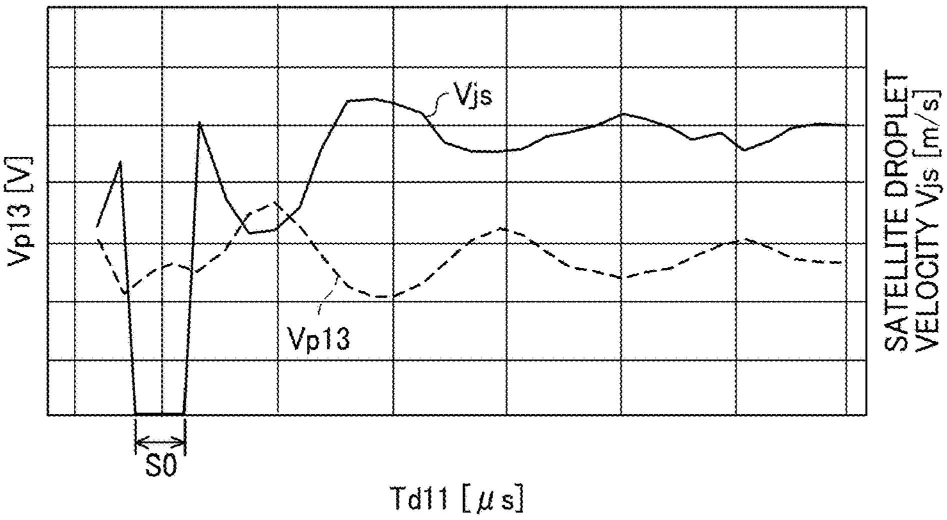
FIG. 18 is a graph illustrating an example of changes in the interval between the first discharge pulse and the non-discharge pulse, the wave height value of the second discharge pulse, and the droplet velocity of the satellite droplets according to the second embodiment.

Next, an example of the relationship between the wave height value Vp13 of the second discharge pulse P13 and the satellite droplet velocity Vjs with respect to the interval Td11 between the first discharge pulse P11 and the non-discharge pulse P12 according to the present embodiment is described referring to FIG. 18.

In this example, the first discharge pulse P11 is a discharge pulse to discharge slow droplets, for which the wave height value Vp11 is set to have a droplet velocity of approximately 5 m/s. The non-discharge pulse P12 is a non-discharge pulse having the low wave height value Vp12 that is usable as a micro-drive waveform to vibrate the meniscus.

The time Td12 between the non-discharge pulse P12 and the second discharge pulse P13 is a resonance timing. The wave height value Vp12 is the voltage corresponding to the voltage within the range S11 described above.

By using the interval Td11 between the first discharge pulse P11 and the non-discharge pulse P12 as a parameter, the wave height value Vp13 of the second discharge pulse P13 is adjusted such that the droplet velocity of merged droplets by the first discharge pulse P11, the non-discharge pulse P12, and the second discharge pulse P13 becomes 7 m/s.

FIG. 18 illustrates the wave height value Vp13 and the satellite droplet velocity Vjs with respect to the interval Td11.

It can be seen from FIG. 18 that the wave height value Vp13 of the second discharge pulse P13 periodically changes in accordance with the residual vibration by the first discharge pulse P11 and the non-discharge pulse P12. In the first resonance timing, i.e., in the timing of the interval Td11 where the wave height value Vp13 is supposed to be smaller, the voltage of the wave height value Vp13 appears to be slightly larger.

The satellite droplet velocity Vjs also appears to periodically change in accordance with the interval Td11, but in the first resonance timing, i.e., when the voltage of the wave height value Vp13 becomes slightly larger, the satellite-less region S0 is obtained.

As described above, in a case where the first discharge pulse P11 is not used, when the voltage is increased to the limit at which the liquid may or may not be discharged by the non-discharge pulse P12, it is possible to obtain the region where the satellite is eliminated, or the satellite droplet velocity is significantly increased.

Conversely, according to the present embodiment, the first discharge pulse P11 is provided before the non-discharge pulse P12. Therefore, when the pressure is applied by the non-discharge pulse P12, the meniscus vibration by the non-discharge pulse P12 is affected by the residual vibration of the first discharge pulse P11.

Accordingly, even when the wave height value Vp12 of the non-discharge pulse P12 is a low voltage so as not to eliminate the satellite or significantly increase the satellite droplet velocity, the meniscus vibration by the non-discharge pulse P12 is amplified to the limit at which the liquid may or may not be discharged. As a result, it is possible to obtain the region where the satellite is eliminated, or the satellite droplet velocity is significantly increased.

Thus, as the wave height value Vp12 of the non-discharge pulse P12 may be set to a low voltage at which no liquid is discharged, the non-discharge pulse P12 is usable as a micro-drive waveform that may vibrate the meniscus without discharging the liquid.

That is, the drive pulse for discharge is provided before the micro-drive pulse that vibrates the meniscus, and thus the residual vibration of the drive pulse amplifies the vibration by the micro-drive pulse so that the micro-drive pulse may have a waveform intensity (wave height value) equivalent to the pulse for satellite suppression.

Thus, even with multiple droplets, such as large and medium droplets, it is possible to obtain the satellite-less state, significantly increase the satellite droplet velocity, omit a dedicated non-discharge pulse for the satellite-less state, shorten the drive waveform length, and allow high-frequency driving.

Figure 19:
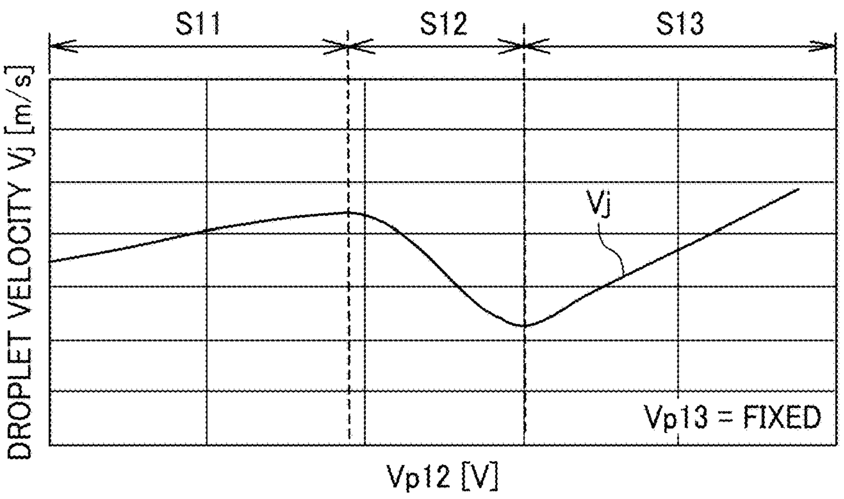
FIG. 19 is a graph illustrating an example of the relationship between the wave height value of the non-discharge pulse and the droplet velocity according to the second embodiment.

Next, the wave height value of the second drive pulse is described referring to FIG. 19. FIG. 19 is a graph illustrating an example of the changes in the droplet velocity Vj when there are two pulses, i.e., the non-discharge pulse P12 and the second discharge pulse P13, and when the wave height value Vp13 of the second discharge pulse P13 is fixed while the wave height value Vp12 of the non-discharge pulse P12 is changed.

In this case, too, the changes in the droplet velocity Vj may be roughly divided into the three ranges S11, S12, and S13 according to the wave height value Vp12.

In this case, the wave height value Vp12 in the range S13 is a voltage that is no longer a non-discharge pulse as the droplets are about to be discharged by the non-discharge pulse P12. Therefore, it is difficult to use the non-discharge pulse P12 as a micro-drive waveform.

Further, the wave height value Vp12 in the range S12 is a voltage at which the non-discharge pulse P12 causes the meniscus to be convex instead of simple vibration. Therefore, it is obvious that the meniscus becomes out of control and continuous driving causes a discharge failure.

Therefore, when the non-discharge pulse P12 is used as a micro-drive waveform (micro-drive pulse), the voltage of the wave height value Vp12 in the range S11 is preferably used. That is, when the non-discharge pulse P12 is used as a micro-drive waveform (micro-drive pulse), the wave height value Vp12 is preferably a voltage at which the droplet velocity is slower than the local maximum value of the droplet velocity.

Next, the relationship between the satellite suppression and the time Td12 between the non-discharge pulse P12 and the second discharge pulse P13 is described referring to FIGS. 20 to 23.

The time Td12 between the non-discharge pulse P12 and the second discharge pulse P13 is made different from the resonance period Tc, the wave height value Vp13 of the second discharge pulse P13 is adjusted to obtain the constant droplet velocity, and the changes in the satellite droplets with respect to the changes in the non-discharge pulse P12 are evaluated.

Figure 20:
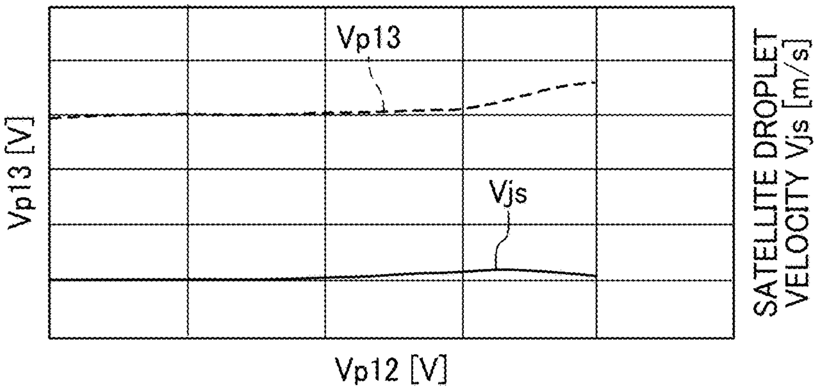
FIG. 20 is a graph illustrating an example of changes in the wave height value of the non-discharge pulse, the wave height value of the second discharge pulse, and the droplet velocity of the satellite droplets according to the second embodiment.

First, FIG. 20 illustrates a case where the time Td12 between the non-discharge pulse P12 and the second discharge pulse P13 is shorter than the resonance period Tc by (⅖)Tc (Td12=Tc−(⅖)Tc).

Under this condition, the condition of the wave height value Vp12 of the non-discharge pulse P12, which obtains the satellite-less state, is not observed.

Figure 21:
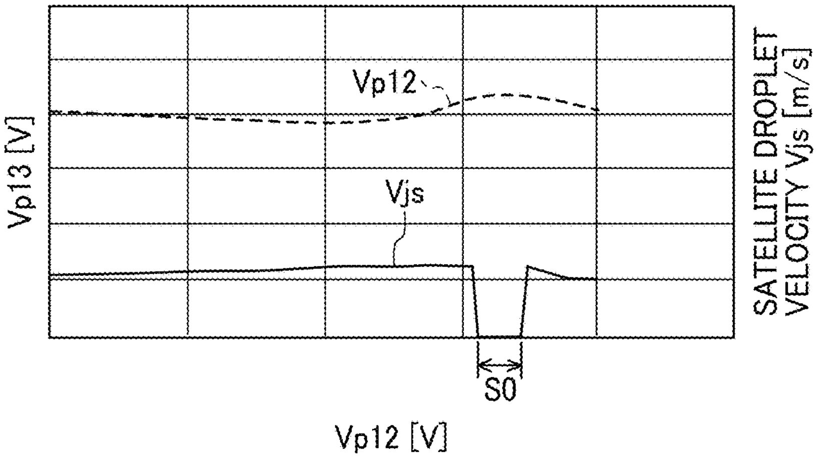
FIG. 21 is a graph illustrating an example of changes in the wave height value of the non-discharge pulse, the wave height value of the second discharge pulse, and the droplet velocity of the satellite droplets according to the second embodiment.

Next, FIG. 21 illustrates a case where the time Td12 between the non-discharge pulse P12 and the second discharge pulse P13 is shorter than the resonance period Tc by (¼)Tc (Td12=Tc−(¼)Tc).

Under this condition, the range of the wave height value Vp12 of the non-discharge pulse P12 is narrow as compared with the case of Td12=Tc, but the satellite-less region S0 is observed.

Figure 22:
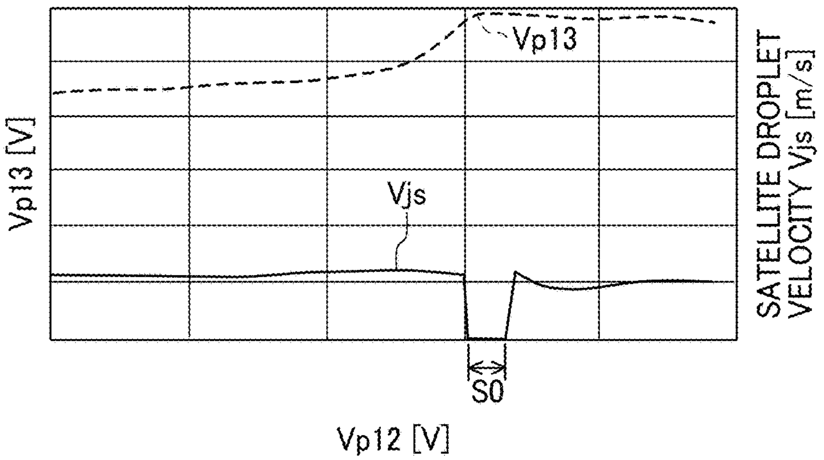
FIG. 22 is a graph illustrating an example of changes in the wave height value of the non-discharge pulse, the wave height value of the second discharge pulse, and the droplet velocity of the satellite droplets according to the second embodiment.

Next, FIG. 22 illustrates a case where the time Td12 between the non-discharge pulse P12 and the second discharge pulse P13 is longer than the resonance period Tc by (⅓)Tc (Td12=Tc+(⅓)Tc).

Under this condition, the range of the wave height value Vp12 of the non-discharge pulse P12 is narrow as compared with the case of Td12=Tc, but the satellite-less region S0 is observed.

Figure 23:
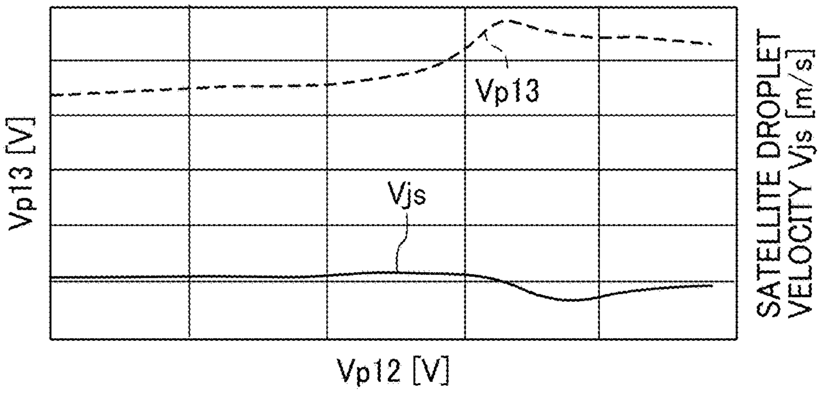
FIG. 23 is a graph illustrating an example of changes in the wave height value of the non-discharge pulse, the wave height value of the second discharge pulse, and the droplet velocity of the satellite droplets according to the second embodiment.

Next, FIG. 23 illustrates a case where the time Td12 between the non-discharge pulse P12 and the second discharge pulse P13 is longer than the resonance period Tc by (½)Tc (Td12=Tc+(½)Tc).

Under this condition, the condition of the wave height value Vp12 of the non-discharge pulse P12, which obtains the satellite-less state, is not observed. The condition for obtaining the satellite-less state is not observed even when the time Td12 is longer than (Tc+(½)Tc).

Next, based on the above results, the relationship between the resonance period Tc and the interval Td2 between the non-discharge pulse P12 and the second discharge pulse P13, which may obtain a satellite-less state, and the wave height value Vp2 of the non-discharge pulse P12 are described referring to FIGS. 24 to 28.

Figure 24:
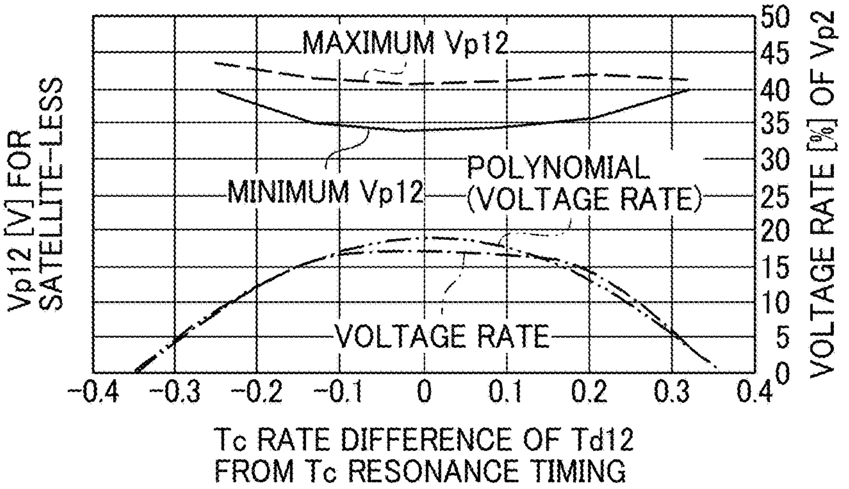
FIG. 24 is a graph illustrating an example of the relationship among the maximum value and the minimum value of the wave height value of the non-discharge pulse, which obtains a satellite-less state, and the voltage rate thereof according to the second embodiment.

FIG. 24 illustrates the relationship among the maximum value and the minimum value of the wave height value Vp12 of the non-discharge pulse P12, which generates the satellite-less region S0, and the voltage rate thereof.

Figure 25:
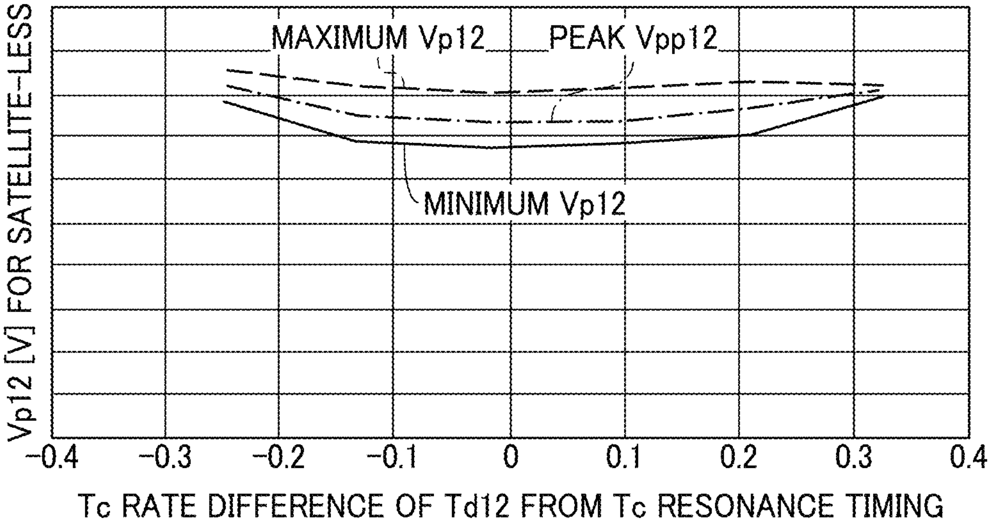
FIG. 25 is a graph illustrating a time and the wave height value of the non-discharge pulse, which obtains a satellite-less state, according to the second embodiment.

The horizontal axis in FIG. 25 represents the Tc rate difference (Tc rate conversion) of the time Td12 between the non-discharge pulse P12 and the second discharge pulse P13 from the resonance period Tc (resonance timing). For example, the Tc rate difference "0.1" represents the evaluation result in the time Td12 (Td12=Tc+0.1Tc) that is longer than the time Td12, which is the same as the resonance period Tc, by (0.1×Tc).

Figure 26:
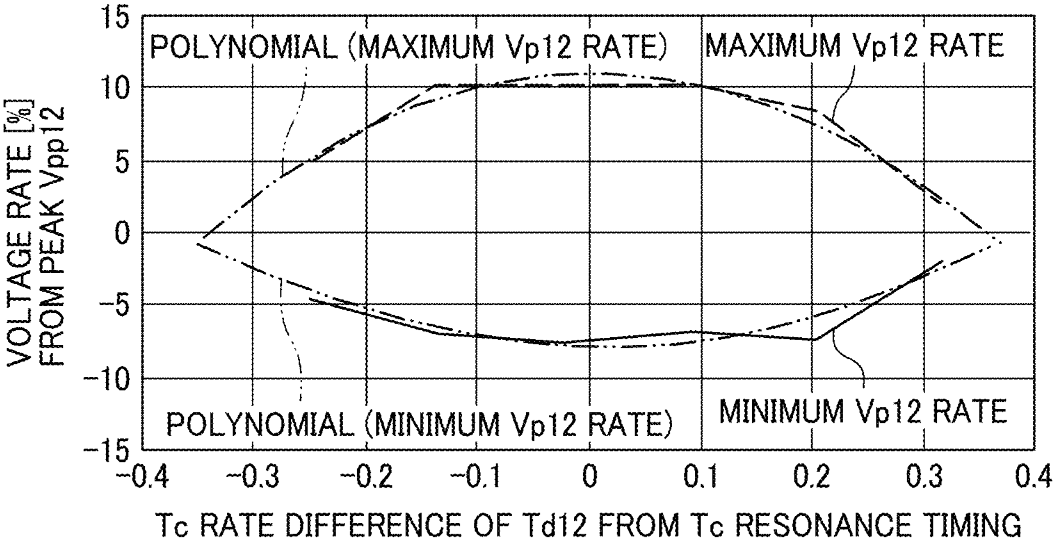
FIG. 26 is a graph illustrating the time and the wave height value of the non-discharge pulse, which obtains a satellite-less state, according to the second embodiment.

FIG. 26 collectively illustrates the maximum value and the minimum value of the wave height value Vp12 of the non-discharge pulse P12, which generates the satellite-less state, and the wave height value Vp12 (referred to as the "peak wave height value Vpp12") when the wave height value Vp13 of the second discharge pulse P13 reaches a peak (when the droplet velocity of the liquid discharged by the second discharge pulse P13 reaches a local minimum value).

As in FIG. 25, the horizontal axis in FIG. 26 represents the Tc rate difference (Tc rate conversion) of the time Td12 between the non-discharge pulse P12 and the second discharge pulse P13 from the resonance period Tc (resonance timing). For example, the Tc rate difference "0.1" represents the evaluation result in the interval Td12 (Td12=Tc+0.1Tc) that is longer than the time Td12, which is the same as the resonance period Tc, by (0.1×Tc).

Figure 27:
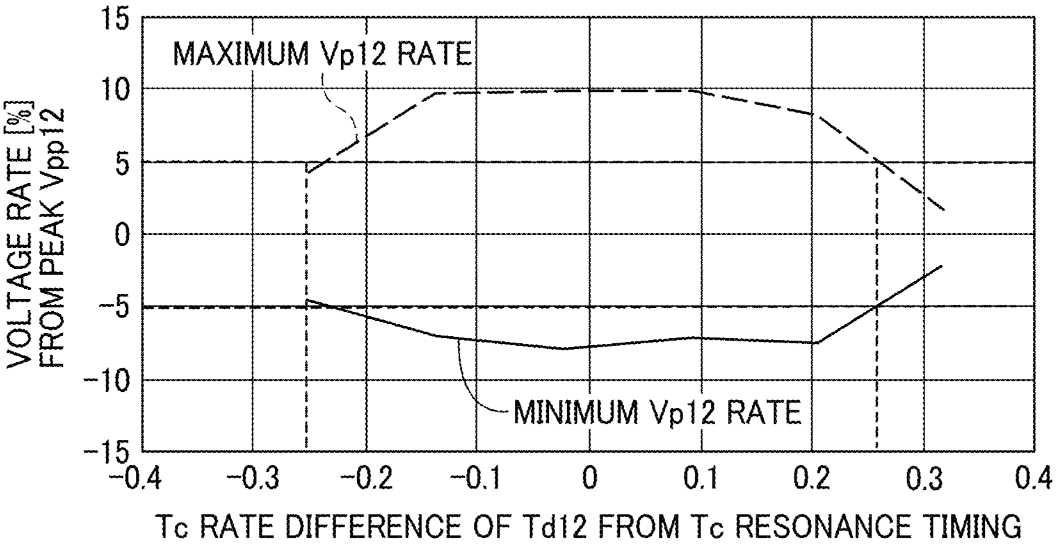
FIG. 27 is a graph illustrating the time and the wave height value of the non-discharge pulse, which obtains a satellite-less state, according to the second embodiment.
Figure 28:
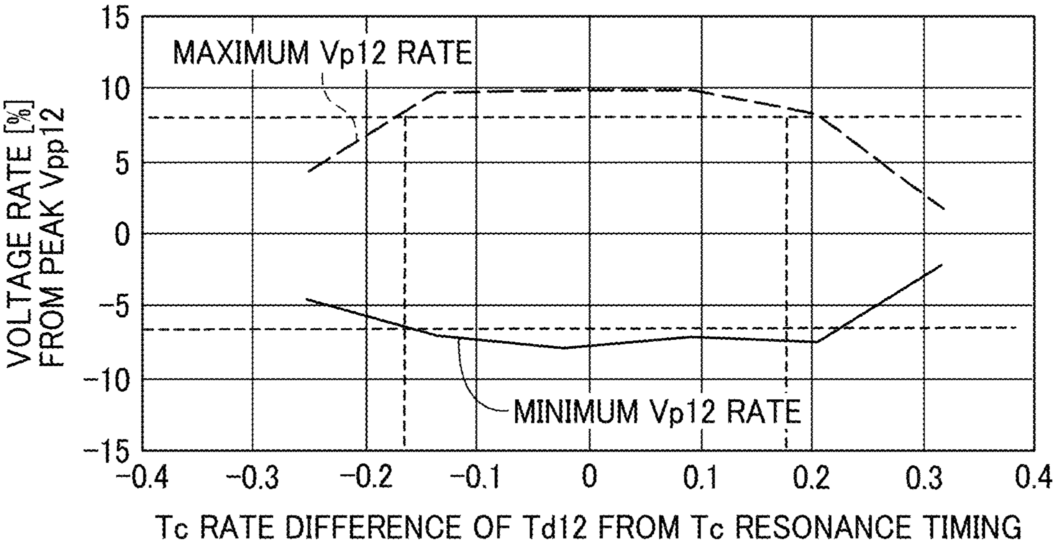
FIG. 28 is a graph illustrating the time and the wave height value of the non-discharge pulse, which obtains a satellite-less state, according to the second embodiment.

FIGS. 27 and 28 illustrate the voltage ranges of the maximum value (maximum Vp22) and the minimum value (minimum Vp22) of a wave height value Vp22 of the non-discharge pulse P12 by using the rate of the voltage difference from the peak wave height value Vpp22.

As in FIG. 26, the horizontal axes in FIGS. 27 and 28 represent the Tc rate difference (Tc rate conversion) of the interval Td12 between the non-discharge pulse P12 and the second discharge pulse P13 from the resonance period Tc (resonance timing). For example, the Tc rate difference "0.1" represents the evaluation result in the interval Td12 (Td12=Tc+0.1Tc) that is longer than the interval Td12, which is the same as the resonance period Tc, by (0.1×Tc).

Thus, it can be seen that, as the interval Td12 between the non-discharge pulse P12 and the second discharge pulse P13 shifts from the resonance period Tc at the center, the voltage range of the wave height value Vp22 of the non-discharge pulse P12, which may obtain a satellite-less state, becomes narrower.

The interval Td12 between the non-discharge pulse P12 and the second discharge pulse P13, which may obtain a satellite-less state, falls within the range of ±⅓Tc (Tc−(⅓)Tc to Tc+(⅓)Tc) (⅓ to 4/3 times the resonance period Tc) with the resonance period Tc at the center.

Furthermore, it can be seen that the non-discharge pulse P12 falls within ±10% of the peak wave height value Vpp12 that is the wave height value Vp12 by which the droplet velocity Vj of the liquid discharged by the second discharge pulse P13 reaches a local minimum value, i.e., the wave height value Vp13 of the second discharge pulse P13 reaches a peak.

To ensure a voltage margin of Δ10% (±5%: −5% to +5%) or more, the time Td12 between the non-discharge pulse P12 and the second discharge pulse P13 preferably falls within the range of (Tc−(¼)Tc to Tc+(¼)Tc).

To ensure a voltage margin of Δ415% (±7.5%: −7.5% to +7.5%) or more, the time Td12 between the non-discharge pulse P12 and the second discharge pulse P13 preferably falls within the range of (Tc−(⅙)Tc to Tc+(⅙)Tc).

When the time Td12 between the non-discharge pulse P12 and the second discharge pulse P13 is the resonance period Tc (Td12=Tc), a voltage margin of Δ20% (±10.0%: −10.0% to +10.0%) or more may be ensured.

Figure 29:
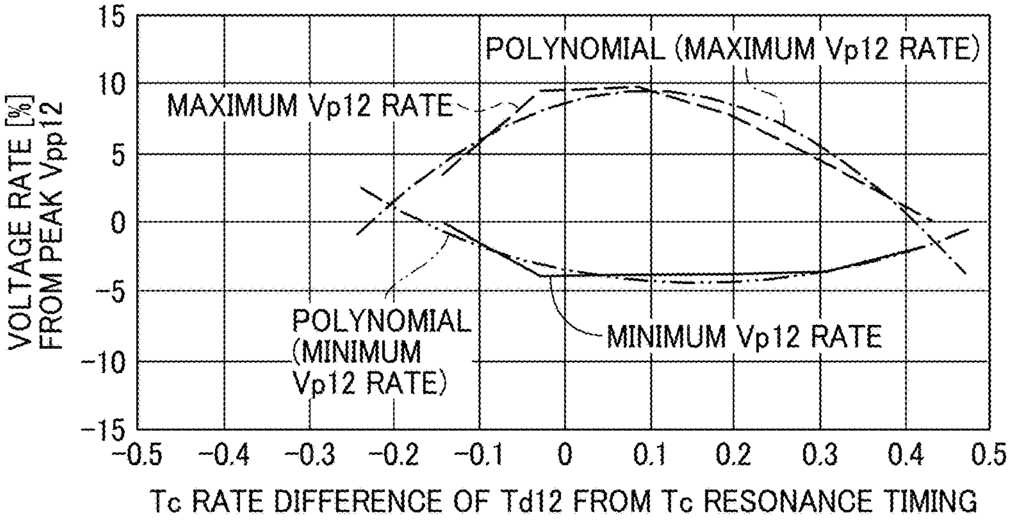
FIG. 29 is a graph illustrating the time and the wave height value of the non-discharge pulse, which obtains a satellite-less state, according to a third embodiment of the present disclosure.
Figure 30:
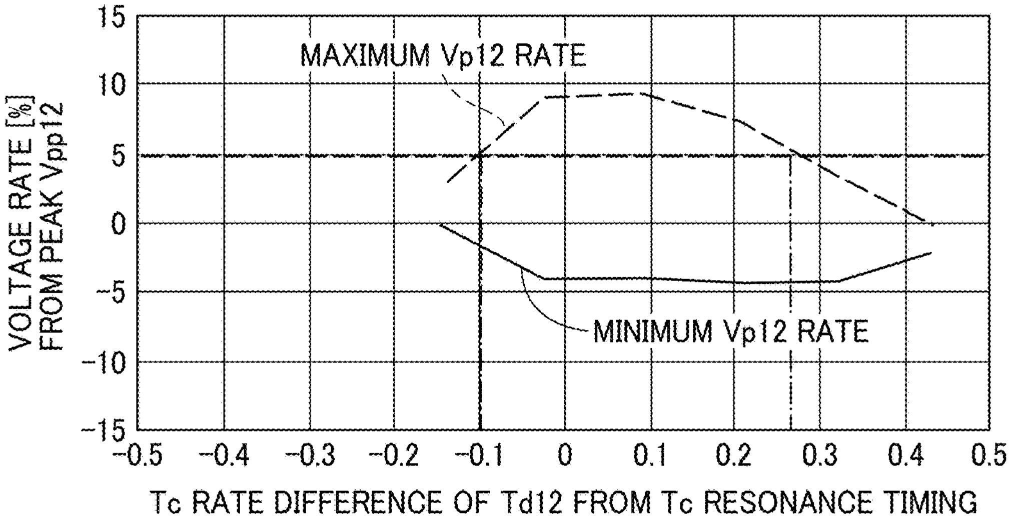
FIG. 30 is a graph illustrating the time and the wave height value of the non-discharge pulse, which obtains a satellite-less state, according to the third embodiment.
Figure 31:
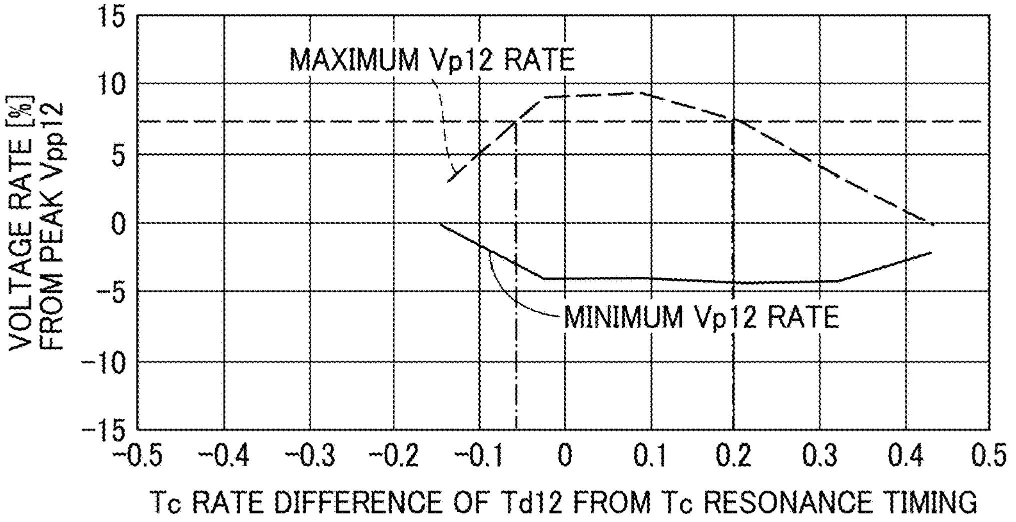
FIG. 31 is a graph illustrating the time and the wave height value of the non-discharge pulse, which obtains a satellite-less state, according to the third embodiment.

Next, a third embodiment of the present disclosure is described referring to FIGS. 29 to 31. FIGS. 29 to 31 are graphs illustrating the relationship between the resonance period Tc and the time Td12 between the non-discharge pulse P12 and the second discharge pulse P13, which may obtain a satellite-less state, and the wave height value Vp12 of the non-discharge pulse P12 according to the present embodiment.

The waveform structure of the drive waveform Va according to the present embodiment is the same as that according to the second embodiment described above.

FIGS. 29 to 31 illustrate the voltage ranges of the maximum value (maximum Vp12) and the minimum value (minimum Vp12) of the wave height value Vp12 of the non-discharge pulse P12 by using the rate of the voltage difference from the peak wave height value Vpp12.

The horizontal axes in FIGS. 29 to 31 represent the Tc rate difference (Tc rate conversion) of the time Td12 between the non-discharge pulse P12 and the second discharge pulse P13 from the resonance period Tc (resonance timing). For example, the Tc rate difference "0.1" represents the evaluation result in the time Td12 (Td12=Tc+0.1Tc) that is longer than the time Td12, which is the same as the resonance period Tc, by (0.1×Tc).

According to the present embodiment, the time Td12 between the non-discharge pulse P12 and the second discharge pulse P13, which may obtain a satellite-less state, falls within the range of Tc−0.2Tc to Tc+0.45Tc, i.e., Tc−(1/5)Tc to Tc+(9/20)Tc.

Furthermore, it can be seen that the non-discharge pulse P12 falls within the range of "−5% to +10%" of the peak wave height value Vpp12, which is the wave height value Vp12 by which the droplet velocity Vj of the liquid discharged by the second discharge pulse P13 reaches a local minimum value, i.e., the wave height value Vp13 of the second discharge pulse P13 reaches a peak.

To ensure a voltage margin of ±5% (−5% to +5%) or more, according to FIG. 30, the time Td12 between the non-discharge pulse P12 and the second discharge pulse P13 preferably falls within the range of Tc−0.1Tc to Tc+0.25Tc, i.e., Tc−(1/10)Tc to Tc+(1/4)Tc.

To ensure a voltage margin of ±7.5% (−7.5% to +7.5%) or more, according to FIG. 31, the time Td12 between the non-discharge pulse P12 and the second discharge pulse P13 preferably falls within the range of Tc−0.07Tc to Tc+0.2Tc, i.e., the range of Tc−(1/14)Tc to Tc+(1/5)Tc.

As described above, the drive waveform generation device according to the second embodiment and the third embodiment generates the drive waveform Va. The drive waveform Va includes, successively in time series, the first discharge pulse P11 that discharges the liquid, the non-discharge pulse P12 that does not discharge the liquid, and the second discharge pulse P13 that discharges the liquid. The non-discharge pulse P12 is usable alone as a micro-drive waveform that vibrates the meniscus to such a degree that the liquid is not discharged. The interval Td1 between the first discharge pulse P11 and the non-discharge pulse P12 and the interval Td2 between the non-discharge pulse P12 and the second discharge pulse P13 have a resonance relationship. The wave height value Vp2 of the non-discharge pulse P12 is a voltage within the range of −10% to +10% of the wave height value Vpp2 by which the droplet velocity Vj reaches a local minimum value when the liquid is discharged after the first discharge pulse P11 is applied, then the non-discharge pulse P12 is applied, and further the second discharge pulse P13 is applied.

The drive waveform generation device according to each embodiment may generate the drive waveform Va. The drive waveform Va includes, successively in time series, the first discharge pulse P11 that discharges the liquid, the non-discharge pulse P12 that does not discharge the liquid, and the second discharge pulse P13 that discharges the liquid. The non-discharge pulse P12 is usable alone as a micro-drive waveform to vibrate the meniscus to such a degree that the liquid is not discharged. The interval Td1 between the first discharge pulse P11 and the non-discharge pulse P12 and the interval Td2 between the non-discharge pulse P12 and the second discharge pulse P13 have a resonance relationship. The wave height value Vp1 of the first discharge pulse P11 is a voltage within the range of −10% to +10% of the wave height value Vpp1 by which the droplet velocity Vj reaches a local minimum value when the liquid is discharged after the first discharge pulse P11 is applied, then the non-discharge pulse P12 is applied, and further the second discharge pulse P13 is applied.

The head drive method according to each embodiment is to generate the drive waveform Va and apply the drive waveform Va to the head to discharge the liquid. The drive waveform Va includes, successively in time series, the first discharge pulse P11 that discharges the liquid, the non-discharge pulse P12 that does not discharge the liquid, and the second discharge pulse P13 that discharges the liquid. The non-discharge pulse P12 is usable alone as a micro-drive waveform to vibrate the meniscus to such a degree that the liquid is not discharged. The interval Td1 between the first discharge pulse P11 and the non-discharge pulse P12 and the interval Td2 between the non-discharge pulse P12 and the second discharge pulse P13 have a resonance relationship. The wave height value Vp2 of the non-discharge pulse P12 is a voltage within the range of −10% to +10% of the wave height value Vpp2 by which the droplet velocity Vj reaches a local minimum value when the liquid is discharged after the first discharge pulse P11 is applied, then the non-discharge pulse P12 is applied, and further the second discharge pulse P13 is applied.

The head drive method according to each embodiment is to generate the drive waveform Va and apply the drive waveform Va to the head to discharge the liquid. The drive waveform Va includes, successively in time series, the first discharge pulse P11 that discharges the liquid, the non-discharge pulse P12 that does not discharge the liquid, and the second discharge pulse P13 that discharges the liquid. The non-discharge pulse P12 is usable alone as a micro-drive waveform to vibrate the meniscus to such a degree that the liquid is not discharged. The interval Td1 between the first discharge pulse P11 and the non-discharge pulse P12 and the interval Td2 between the non-discharge pulse P12 and the second discharge pulse P13 have a resonance relationship. The wave height value Vp1 of the first discharge pulse P11 is a voltage within the range of −10% to +10% of the wave height value Vpp1 by which the droplet velocity Vj reaches a local minimum value when the liquid is discharged after the first discharge pulse P11 is applied, then the non-discharge pulse P12 is applied, and further the second discharge pulse P13 is applied.

According to the present embodiment, the discharged liquid is not limited to a particular liquid as long as the liquid has a viscosity or surface tension that allows discharge from the head. However, the viscosity of the liquid is preferably 30 mPa·s or less under ordinary temperature and ordinary pressure or by heating or cooling. Examples of the liquid include a solution, a suspension, or an emulsion that contains, for example, a solvent, such as water or an organic solvent, a colorant, such as dye or pigment, a functional material, such as a polymerizable compound, a resin, or a surfactant, a biocompatible material, such as DNA, amino acid, protein, or calcium, or an edible material, such as a natural colorant. Such a solution, a suspension, or an emulsion may be used for, e.g., inkjet ink, surface treatment solution, a liquid for forming components of electronic element or light-emitting element or a resist pattern of electronic circuit, or a material solution for three-dimensional fabrication.

Examples of the source to generate energy for discharging the liquid include a piezoelectric actuator (a laminated piezoelectric element or a thin-film piezoelectric element), a thermal actuator that employs a thermoelectric conversion element, such as a heating resistor, and an electrostatic actuator including a diaphragm and opposed electrodes.

The "liquid discharge apparatus" also includes an apparatus that discharges the liquid toward gas or into a liquid as well as an apparatus that may discharge a liquid to a material to which the liquid may adhere.

The "liquid discharge apparatus" may also include units regarding feeding, conveyance, and paper ejection of a material to which the liquid may adhere, pretreatment apparatuses, post-treatment apparatuses, etc.

The "liquid discharge apparatus" may include, for example, an image forming apparatus that discharges the ink to form an image on a sheet and a solid fabrication apparatus (three-dimensional fabrication apparatus) that discharges a fabrication liquid to a powder layer, in which powder material is formed in layers, to form a solid fabrication object (three-dimensional fabrication object).

The "liquid discharge apparatus" is not limited to an apparatus that discharges the liquid to visualize meaningful images, such as letters or figures. For example, the liquid discharge apparatus also includes an apparatus that forms arbitrary patterns, or the like, or fabricate three-dimensional images.

The above-described "material to which the liquid may adhere" may refer to a material to which the liquid may adhere at least temporarily, a material to which the liquid adheres to be fixed, or a material to which the liquid adheres to permeate. Examples thereof include recording media, such as paper, recording paper, recording sheet, film, and cloth, electronic component, such as electronic substrate and piezoelectric element, and media, such as powder layer, organ model, and testing cell. The "material to which the liquid may adhere" includes any material to which the liquid adheres unless limited.

Examples of the "material to which the liquid may adhere" may include any materials to which the liquid may adhere even temporarily, such as paper, thread, fiber, fabric, leather, metal, plastic, glass, wood, and ceramic.

The "liquid discharge apparatus" may include, but is not limited thereto, an apparatus that relatively moves the head and the material to which the liquid may adhere. Examples thereof include a serial apparatus that moves the head or a line apparatus that does not move the head.

Examples of the "liquid discharge apparatus" further include a treatment liquid coating apparatus to discharge a treatment liquid to a sheet to coat the treatment liquid on the surface of the sheet to reform the sheet surface and an injection granulation apparatus in which a composition liquid including raw materials dispersed in a solution is injected through nozzles to granulate fine particles of the raw materials.

The terms "image formation", "recording", "printing", "image printing", and "fabricating" used herein may be used synonymously with each other.

According to the present embodiment, the satellite and the mist may be suppressed.

In the above-described embodiments of the present disclosure, the configuration requirements may be modified, added, or deleted as appropriate without departing from the scope of the present disclosure. The present disclosure is not limited to the embodiments described above, and many modifications are possible within the technical concept of the present disclosure by persons skilled in the art.

[Aspect 1]

A liquid discharge apparatus includes: a head (100) including a pressure chamber (106) and a nozzle, the head (100) configured to discharge a liquid in the pressure chamber from the nozzle (104); circuitry (402) configured to generate a drive waveform including multiple drive pulses to be applied to the head (100), the drive waveform successively including, in time series: a non-discharge pulse (P1) that does not cause the head (100) to discharge the liquid from the nozzle (104); a latter discharge pulse (P2) after the non-discharge pulse (P1), the latter discharge pulse (P2) including a contraction waveform element (c2) that contracts the pressure chamber (106) to discharge the liquid from the nozzle (104); and a contraction waveform (P3) including the contraction waveform element (c3) that contracts the pressure chamber (106), wherein a wave height value (Vp1) of the non-discharge pulse (P1) is within ±10% of a wave height value (Vp1) of the non-discharge pulse (P1) when a droplet velocity (Vj) of the liquid discharged by successively applying the non-discharge pulse (P1) and the latter discharge pulse (P2) to the head (100) reaches the minimum value, and a time from a start of the contraction waveform element (c2) of the latter discharge pulse (P2) to a start of the contraction waveform element (c3) of the contraction waveform (P3) is ±1/6 to 5/6 times of a resonance period of the pressure chamber (106).

[Aspect 2]

In the liquid discharge apparatus according to claim 1, an interval (Td) between the non-discharge pulse (P1) and the latter discharge pulse (P2) is 2/3 to 4/3 of the resonance period of the pressure chamber (106).

[Aspect 3]

In the liquid discharge apparatus according to claim 1, the drive waveform further includes: a former discharge pulse (P11) before the non-discharge pulse (P12), the former discharge pulse (P11) causing the head (100) to discharge the liquid from the nozzle (104), a first interval (Td11) between the former discharge pulse (P11) and the non-discharge pulse (P12) at which the non-discharge pulse (P12) resonate with the former discharge pulse (P11); and a second interval (Td12) between the non-discharge pulse (P12) and the latter discharge pulse (P13) at which the latter discharge pulse (P13) resonate with the non-discharge pulse (P12), and the non-discharge pulse (P12) causes the head (100) not to discharged the liquid from the nozzle (104) while causing meniscus of the liquid in the nozzle (104) to vibrate, the wave height value (Vp12) of the non-discharge pulse (P12) is within ±10% of a wave height value of the non-discharge pulse (P12) when the droplet velocity of the liquid discharged by successively applying the former discharge pulse (P11), the non-discharge pulse (P12) and the latter discharge pulse (P13) to the head (100) reaches the minimum value.

[Aspect 4]

In the liquid discharge apparatus according to claim 1, the drive waveform further includes: a former discharge pulse (P11) before the non-discharge pulse (P12), the former discharge pulse (P11) causing the head (100) to discharge the liquid from the nozzle (104), a first interval (Td11) between the former discharge pulse (P11) and the non-discharge pulse (P12) at which the non-discharge pulse (P12) resonate with the former discharge pulse (P11); and a second interval (Td12) between the non-discharge pulse (P12) and the latter discharge pulse (P13) at which the latter discharge pulse (P13) resonate with the non-discharge pulse (P12), and the non-discharge pulse (P12) causes the head (100) not to discharged the liquid from the nozzle (104) while causing meniscus of the liquid in the nozzle (104) to vibrate, the wave height value (Vp11) of the former discharge pulse (P11) is within ±10% of a wave height value of the non-discharge pulse (P12) when the droplet velocity of the liquid discharged by successively applying the former discharge pulse (P11), the non-discharge pulse (P12) and the latter discharge pulse (P13) to the head (100) reaches the minimum value.

[Aspect 5]

In the liquid discharge apparatus according to claim 3, the wave height value (Vp12) of the non-discharge pulse (P12) is lower than a wave height value of the non-discharge pulse (P12) when the droplet velocity of the liquid discharged by successively applying the non-discharge pulse (P12) and the latter discharge pulse (P13) reaches the maximum value.

[Aspect 6]

In the liquid discharge apparatus according to claim 1, the contraction waveform element (c3) of the contraction waveform (P3) has the opposite phase with respect to a residual vibration of the pressure chamber (106).

[Aspect 7]

A drive waveform generator (402) includes: circuitry (402) configured to generate a drive waveform including multiple drive pulses to be applied to a head (100) including a pressure chamber (106) and a nozzle, the head (100) to discharge a liquid in the pressure chamber from the nozzle (104); the drive waveform successively including, in time series: a non-discharge pulse (P1) that does not cause the head (100) to discharge the liquid from the nozzle (104); a latter discharge pulse (P2) after the non-discharge pulse (P1), the latter discharge pulse (P2) including a contraction waveform element (c2) that contracts the pressure chamber (106) to discharge the liquid from the nozzle (104); and a contraction waveform (P3) including the contraction waveform element (c3) that contracts the pressure chamber (106), wherein a wave height value (Vp1) of the non-discharge pulse (P1) is within ±10% of a wave height value (Vp1) of the non-discharge pulse (P1) when a droplet velocity (Vj) of the liquid discharged by successively applying the non-discharge pulse (P1) and the latter discharge pulse (P2) to the head (100) reaches the minimum value, and a time from a start of the contraction waveform element (c2) of the latter discharge pulse (P2) to a start of the contraction waveform element (c3) of the contraction waveform (P3) is ±⅙ to ⅚ times of a resonance period of the pressure chamber (106).

[Aspect 8]

In the drive waveform generator (402) according to claim 7, an interval (Td) between the non-discharge pulse (P1) and the latter discharge pulse (P2) is ⅔ to 4/3 of the resonance period of the pressure chamber (106).

[Aspect 9]

In the drive waveform generator (402) according to claim 7, the drive waveform further includes: a former discharge pulse (P11) before the non-discharge pulse (P12), the former discharge pulse (P11) causing the head (100) to discharge the liquid from the nozzle (104), a first interval (Td11) between the former discharge pulse (P11) and the non-discharge pulse (P12) at which the non-discharge pulse (P12) resonate with the former discharge pulse (P11); and a second interval (Td12) between the non-discharge pulse (P12) and the latter discharge pulse (P13) at which the latter discharge pulse (P13) resonate with the non-discharge pulse (P12), and the non-discharge pulse (P12) causes the head (100) not to discharged the liquid from the nozzle (104) while causing meniscus of the liquid in the nozzle (104) to vibrate, the wave height value (Vp12) of the non-discharge pulse (P12) is within ±10% of a wave height value of the non-discharge pulse (P12) when the droplet velocity of the liquid discharged by successively applying the former discharge pulse (P11), the non-discharge pulse (P12) and the latter discharge pulse (P13) to the head (100) reaches the minimum value.

[Aspect 10]

In the drive waveform generator (402) according to claim 7, the drive waveform further includes: a former discharge pulse (P11) before the non-discharge pulse (P12), the former discharge pulse (P11) causing the head (100) to discharge the liquid from the nozzle (104), a first interval (Td11) between the former discharge pulse (P11) and the non-discharge pulse (P12) at which the non-discharge pulse (P12) resonate with the former discharge pulse (P11); and a second interval (Td12) between the non-discharge pulse (P12) and the latter discharge pulse (P13) at which the latter discharge pulse (P13) resonate with the non-discharge pulse (P12), and the non-discharge pulse (P12) causes the head (100) not to discharged the liquid from the nozzle (104) while causing meniscus of the liquid in the nozzle (104) to vibrate, the wave height value (Vp11) of the former discharge pulse (P11) is within ±10% of a wave height value of the non-discharge pulse (P12) when the droplet velocity of the liquid discharged by successively applying the former discharge pulse (P11), the non-discharge pulse (P12) and the latter discharge pulse (P13) to the head (100) reaches the minimum value.

[Aspect 11]

In the liquid discharge apparatus according to claim 9, the wave height value (Vp12) of the non-discharge pulse (P12) is lower than a wave height value of the non-discharge pulse (P12) when the droplet velocity of the liquid discharged by successively applying the non-discharge pulse (P12) and the latter discharge pulse (P13) reaches the maximum value.

[Aspect 12]

In the liquid discharge apparatus according to claim 7, the contraction waveform element (c3) of the contraction waveform (P3) has the opposite phase with respect to a residual vibration of the pressure chamber (106).

[Aspect 13]

A head driving method includes: generating a drive waveform including multiple drive pulses to be applied to a head (100) including a pressure chamber (106) and a nozzle, the head (100) to discharge a liquid in the pressure chamber from the nozzle (104); the drive waveform successively including, in time series: a non-discharge pulse (P1) that does not cause the head (100) to discharge the liquid from the nozzle (104); a latter discharge pulse (P2) after the non-discharge pulse (P1), the latter discharge pulse (P2) including a contraction waveform element (c2) that contracts the pressure chamber (106) to discharge the liquid from the nozzle (104); and a contraction waveform (P3) including the contraction waveform element (c3) that contracts the pressure chamber (106), wherein a wave height value (Vp1) of the non-discharge pulse (P1) is within ±10% of a wave height value (Vp1) of the non-discharge pulse (P1) when a droplet velocity (Vj) of the liquid discharged by successively applying the non-discharge pulse (P1) and the latter discharge pulse (P2) to the head (100) reaches the minimum value, and a time from a start of the contraction waveform element (c2) of the latter discharge pulse (P2) to a start of the contraction waveform element (c3) of the contraction waveform (P3) is ±⅙ to ⅚ times of a resonance period of the pressure chamber (106).

[Aspect 14]

In the head driving method according to claim 13, an interval (Td) between the non-discharge pulse (P1) and the latter discharge pulse (P2) is ⅔ to 4/3 of the resonance period of the pressure chamber (106).

[Aspect 15]

In the head driving method according to claim 13, the drive waveform further includes: a former discharge pulse (P11) before the non-discharge pulse (P12), the former discharge pulse (P11) causing the head (100) to discharge the liquid from the nozzle (104), a first interval (Td11) between the former discharge pulse (P11) and the non-discharge pulse (P12) at which the non-discharge pulse (P12) resonate with the former discharge pulse (P11); and a second interval (Td12) between the non-discharge pulse (P12) and the latter discharge pulse (P13) at which the latter discharge pulse (P13) resonate with the non-discharge pulse (P12), and the non-discharge pulse (P12) causes the head (100) not to discharged the liquid from the nozzle (104) while causing meniscus of the liquid in the nozzle (104) to vibrate, the wave height value (Vp12) of the non-discharge pulse (P12) is within ±10% of a wave height value of the non-discharge pulse (P12) when the droplet velocity of the liquid discharged by successively applying the former discharge pulse (P11), the non-discharge pulse (P12) and the latter discharge pulse (P13) to the head (100) reaches the minimum value.

[Aspect 16]

In the head driving method according to claim 13, the drive waveform further includes: a former discharge pulse (P11) before the non-discharge pulse (P12), the former discharge pulse (P11) causing the head (100) to discharge the liquid from the nozzle (104), a first interval (Td11) between the former discharge pulse (P11) and the non-discharge pulse (P12) at which the non-discharge pulse (P12) resonate with the former discharge pulse (P11); and a second interval (Td12) between the non-discharge pulse (P12) and the latter discharge pulse (P13) at which the latter discharge pulse (P13) resonate with the non-discharge pulse (P12), and the non-discharge pulse (P12) causes the head (100) not to discharged the liquid from the nozzle (104) while causing meniscus of the liquid in the nozzle (104) to vibrate, the wave height value (Vp11) of the former discharge pulse (P11) is within ±10% of a wave height value of the non-discharge pulse (P12) when the droplet velocity of the liquid discharged by successively applying the former discharge pulse (P11), the non-discharge pulse (P12) and the latter discharge pulse (P13) to the head (100) reaches the minimum value.

[Aspect 17]

In the liquid discharge apparatus according to claim 15, the wave height value (Vp12) of the non-discharge pulse (P12) is lower than a wave height value of the non-discharge pulse (P12) when the droplet velocity of the liquid discharged by successively applying the non-discharge pulse (P12) and the latter discharge pulse (P13) reaches the maximum value.

[Aspect 18]

In the liquid discharge apparatus according to claim 13, the contraction waveform element (c3) of the contraction waveform (P3) has the opposite phase with respect to the residual vibration of the pressure chamber (106).

The functionality of the elements disclosed herein such as the drive waveform generator 402 or the head drive control device 400, may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The invention claimed is:

1. A liquid discharge apparatus comprising:

a head including a pressure chamber and a nozzle, the head configured to discharge a liquid in the pressure chamber from the nozzle;

circuitry configured to generate a drive waveform including multiple drive pulses to be applied to the head, the drive waveform successively including, in time series:

a non-discharge pulse that does not cause the head to discharge the liquid from the nozzle;

a latter discharge pulse after the non-discharge pulse, the latter discharge pulse including a contraction waveform element that contracts the pressure chamber to discharge the liquid from the nozzle; and a contraction waveform including the contraction waveform element that contracts the pressure chamber, wherein a wave height value of the non-discharge pulse is within ±10% of a wave height value of the non-discharge pulse when a droplet velocity of the liquid discharged by successively applying the non-discharge pulse and the latter discharge pulse to the head reaches a minimum value, and a time from a start of the contraction waveform element of the latter discharge pulse to a start of the contraction waveform element of the contraction waveform is $\pm 1/6$ to $5/6$ times of a resonance period of the pressure chamber.

2. The liquid discharge apparatus according to claim 1, wherein an interval between the non-discharge pulse and the latter discharge pulse is $2/3$ to $4/3$ of the resonance period of the pressure chamber.

3. The liquid discharge apparatus according to claim 1, wherein the drive waveform further includes:

a former discharge pulse before the non-discharge pulse, the former discharge pulse causing the head to discharge the liquid from the nozzle, a first interval between the former discharge pulse and the non-discharge pulse at which the non-discharge pulse resonates with the former discharge pulse; and a second interval between the non-discharge pulse and the latter discharge pulse at which the latter discharge pulse resonates with the non-discharge pulse, and the non-discharge pulse causes the head not to discharge the liquid from the nozzle while causing meniscus of the liquid in the nozzle to vibrate, the wave height value of the non-discharge pulse is within ±10% of a wave height value of the non-discharge pulse when the droplet velocity of the liquid discharged by successively applying the former discharge pulse, the non-discharge pulse and the latter discharge pulse to the head reaches the minimum value.

4. The liquid discharge apparatus according to claim 3, wherein the wave height value of the non-discharge pulse is lower than a wave height value of the non-discharge pulse when the droplet velocity of the liquid discharged by successively applying the non-discharge pulse and the latter discharge pulse reaches the maximum value.

5. The liquid discharge apparatus according to claim 1, wherein the drive waveform further includes:

a former discharge pulse before the non-discharge pulse, the former discharge pulse causing the head to discharge the liquid from the nozzle, a first interval between the former discharge pulse and the non-discharge pulse at which the non-discharge pulse resonates with the former discharge pulse; and a second interval between the non-discharge pulse and the latter discharge pulse at which the latter discharge pulse resonates with the non-discharge pulse, and the non-discharge pulse causes the head not to discharge the liquid from the nozzle while causing meniscus of the liquid in the nozzle to vibrate, a wave height value of the former discharge pulse is within ±10% of a wave height value of the non-discharge pulse when the droplet velocity of the liquid discharged by successively applying the former discharge pulse, the non-discharge pulse and the latter discharge pulse to the head reaches the minimum value.

6. The liquid discharge apparatus according to claim 1, wherein the contraction waveform element of the contraction waveform has an opposite phase with respect to a residual vibration of the pressure chamber.

7. A drive waveform generator comprising:

circuitry configured to generate a drive waveform including multiple drive pulses to be applied to a head including a pressure chamber and a nozzle, the head to discharge a liquid in the pressure chamber from the nozzle;

the drive waveform successively including, in time series:

a non-discharge pulse that does not cause the head to discharge the liquid from the nozzle;

a latter discharge pulse after the non-discharge pulse, the latter discharge pulse including a contraction waveform element that contracts the pressure chamber to discharge the liquid from the nozzle; and a contraction waveform including the contraction waveform element that contracts the pressure chamber, wherein a wave height value of the non-discharge pulse is within ±10% of a wave height value of the non-discharge pulse when a droplet velocity of the liquid discharged by successively applying the non-discharge pulse and the latter discharge pulse to the head reaches a minimum value, and a time from a start of the contraction waveform element of the latter discharge pulse to a start of the contraction waveform element of the contraction waveform is ±1/6 to 5/6 times of a resonance period of the pressure chamber.

8. The drive waveform generator according to claim 7, wherein an interval between the non-discharge pulse and the latter discharge pulse is 2/3 to 4/3 of the resonance period of the pressure chamber.

9. The drive waveform generator according to claim 7, wherein the drive waveform further includes:

a former discharge pulse before the non-discharge pulse, the former discharge pulse causing the head to discharge the liquid from the nozzle, a first interval between the former discharge pulse and the non-discharge pulse at which the non-discharge pulse resonates with the former discharge pulse; and a second interval between the non-discharge pulse and the latter discharge pulse at which the latter discharge pulse resonates with the non-discharge pulse, and the non-discharge pulse causes the head not to discharge the liquid from the nozzle while causing meniscus of the liquid in the nozzle to vibrate, the wave height value of the non-discharge pulse is within ±10% of a wave height value of the non-discharge pulse when the droplet velocity of the liquid discharged by successively applying the former discharge pulse, the non-discharge pulse and the latter discharge pulse to the head reaches the minimum value.

10. The drive waveform generator according to claim 9, wherein the wave height value of the non-discharge pulse is lower than a wave height value of the non-discharge pulse when the droplet velocity of the liquid discharged by successively applying the non-discharge pulse and the latter discharge pulse reaches the maximum value.

11. The drive waveform generator according to claim 7, wherein the drive waveform further includes:

a former discharge pulse before the non-discharge pulse, the former discharge pulse causing the head to discharge the liquid from the nozzle, a first interval between the former discharge pulse and the non-discharge pulse at which the non-discharge pulse resonates with the former discharge pulse; and a second interval between the non-discharge pulse and the latter discharge pulse at which the latter discharge pulse resonates with the non-discharge pulse, and the non-discharge pulse causes the head not to discharge the liquid from the nozzle while causing meniscus of the liquid in the nozzle to vibrate, a wave height value of the former discharge pulse is within ±10% of a wave height value of the non-discharge pulse when the droplet velocity of the liquid discharged by successively applying the former discharge pulse, the non-discharge pulse and the latter discharge pulse to the head reaches the minimum value.

12. The drive waveform generator according to claim 7, wherein the contraction waveform element of the contraction waveform has an opposite phase with respect to a residual vibration of the pressure chamber.

13. A head driving method comprising:

generating a drive waveform including multiple drive pulses to be applied to a head including a pressure chamber and a nozzle, the head to discharge a liquid in the pressure chamber from the nozzle;

the drive waveform successively including, in time series:

a non-discharge pulse that does not cause the head to discharge the liquid from the nozzle;

a latter discharge pulse after the non-discharge pulse, the latter discharge pulse including a contraction waveform element that contracts the pressure chamber to discharge the liquid from the nozzle; and a contraction waveform including the contraction waveform element that contracts the pressure chamber, wherein a wave height value of the non-discharge pulse is within ±10% of a wave height value of the non-discharge pulse when a droplet velocity of the liquid discharged by successively applying the non-discharge pulse and the latter discharge pulse to the head reaches a minimum value, and a time from a start of the contraction waveform element of the latter discharge pulse to a start of the contraction waveform element of the contraction waveform is ±⅙ to ⅚ times of a resonance period of the pressure chamber.

14. The head driving method according to claim 13, wherein an interval between the non-discharge pulse and the latter discharge pulse is ⅔ to 4/3 of the resonance period of the pressure chamber.

15. The head driving method according to claim 13, wherein the drive waveform further includes:

a former discharge pulse before the non-discharge pulse, the former discharge pulse causing the head to discharge the liquid from the nozzle, a first interval between the former discharge pulse and the non-discharge pulse at which the non-discharge pulse resonates with the former discharge pulse; and a second interval between the non-discharge pulse and the latter discharge pulse at which the latter discharge pulse resonates with the non-discharge pulse, and the non-discharge pulse causes the head not to discharge the liquid from the nozzle while causing meniscus of the liquid in the nozzle to vibrate, the wave height value of the non-discharge pulse is within ±10% of a wave height value of the non-discharge pulse when the droplet velocity of the liquid discharged by successively applying the former discharge pulse, the non-discharge pulse and the latter discharge pulse to the head reaches the minimum value.

16. The head driving method according to claim 15, wherein the wave height value of the non-discharge pulse is lower than a wave height value of the non-discharge pulse when the droplet velocity of the liquid discharged by successively applying the non-discharge pulse and the latter discharge pulse reaches the maximum value.

17. The head driving method according to claim 13, wherein the drive waveform further includes:

a former discharge pulse before the non-discharge pulse, the former discharge pulse causing the head to discharge the liquid from the nozzle, a first interval between the former discharge pulse and the non-discharge pulse at which the non-discharge pulse resonates with the former discharge pulse; and a second interval between the non-discharge pulse and the latter discharge pulse at which the latter discharge pulse resonates with the non-discharge pulse, and the non-discharge pulse causes the head not to discharge the liquid from the nozzle while causing meniscus of the liquid in the nozzle to vibrate, a wave height value of the former discharge pulse is within ±10% of a wave height value of the non-discharge pulse when the droplet velocity of the liquid discharged by successively applying the former discharge pulse, the non-discharge pulse and the latter discharge pulse to the head reaches the minimum value.

18. The head driving method according to claim 13, wherein the contraction waveform element of the contraction waveform has an opposite phase with respect to a residual vibration of the pressure chamber.

* * * * *